US007661600B2

(12) United States Patent
Theodossiou et al.

(10) Patent No.: US 7,661,600 B2
(45) Date of Patent: *Feb. 16, 2010

(54) LASER ETCHED SECURITY FEATURES FOR IDENTIFICATION DOCUMENTS AND METHODS OF MAKING SAME

(75) Inventors: George Theodossiou, Brockton, MA (US); Robert L. Jones, Andover, MA (US)

(73) Assignee: L-1 Identify Solutions, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/737,533

(22) Filed: Apr. 19, 2007

(65) Prior Publication Data

US 2007/0187515 A1 Aug. 16, 2007

Related U.S. Application Data

(63) Continuation of application No. 10/330,033, filed on Dec. 24, 2002, now Pat. No. 7,207,494.

(60) Provisional application No. 60/344,716, filed on Dec. 24, 2001.

(51) Int. Cl.
*G06K 19/06* (2006.01)

(52) U.S. Cl. ........................ 235/492; 235/488; 235/487

(58) Field of Classification Search ................. 235/380, 235/382, 487, 488, 492
See application file for complete search history.

(56) References Cited

U.S. PATENT DOCUMENTS 2,815,310 A 12/1957 Anderson
2,957,830 A 10/1960 Goldberg
3,153,166 A 10/1964 Thornton, Jr. et al.
3,225,457 A 12/1965 Schure
3,238,595 A 3/1966 Schwartz
3,413,171 A 11/1968 Hannon
3,496,262 A 2/1970 Long et al.
3,571,957 A 3/1971 Cumming et al.
3,582,439 A 6/1971 Thomas
3,601,913 A 8/1971 Pollock
3,614,430 A 10/1971 Berler
3,614,839 A 10/1971 Thomas
3,640,009 A 2/1972 Komiyama (Continued)

FOREIGN PATENT DOCUMENTS

CA 2470094 6/2003

(Continued)

OTHER PUBLICATIONS

PCT—Notification of Transmittal of the International Search Report or the Declaration and International Search Report for International Application No. PCT/US02/41681, mailed on Jun. 5, 2003.

(Continued)

*Primary Examiner*—Karl D. Frech
(74) *Attorney, Agent, or Firm*—Mintz Levin Cohn Ferris Glovsky and Popeo, PC

(57) ABSTRACT

Identification documents employing laser-etched or -engraved features are detailed, together with methods for their manufacture. Tactile effects produced by the laser-processed features may be felt by touch, helping confirm the authenticity of such documents.

8 Claims, 5 Drawing Sheets

(A)

U.S. PATENT DOCUMENTS

| | | | |
|---|---|---|---|
| 3,647,275 | A | 3/1972 | Ward |
| 3,758,970 | A | 9/1973 | Annenberg |
| 3,802,101 | A | 4/1974 | Scantlin |
| 3,860,558 | A | 1/1975 | Klemchuk |
| 3,914,484 | A | 10/1975 | Creegan et al. |
| 3,929,701 | A | 12/1975 | Hall |
| 3,932,036 | A | 1/1976 | Ueda et al. |
| 3,949,501 | A | 4/1976 | Andrews et al. |
| 3,953,869 | A | 4/1976 | Lo et al. |
| 3,961,956 | A | 6/1976 | Fukuda et al. |
| 3,975,291 | A | 8/1976 | Claussen et al. |
| 3,987,711 | A | 10/1976 | Silver |
| 4,035,740 | A | 7/1977 | Schafer et al. |
| 4,051,374 | A | 9/1977 | Drexhage et al. |
| 4,072,911 | A | 2/1978 | Walther et al. |
| 4,082,873 | A | 4/1978 | Williams |
| 4,096,015 | A | 6/1978 | Kawamata et al. |
| 4,100,509 | A | 7/1978 | Walther et al. |
| 4,104,555 | A | 8/1978 | Heming |
| 4,119,361 | A | 10/1978 | Greenway |
| 4,121,003 | A | 10/1978 | Williams |
| 4,131,337 | A | 12/1978 | Moraw et al. |
| 4,155,618 | A | 5/1979 | Regnault et al. |
| 4,171,766 | A | 10/1979 | Ruell |
| 4,183,989 | A | 1/1980 | Tooth |
| 4,184,701 | A | 1/1980 | Franklin et al. |
| 4,256,900 | A | 3/1981 | Raue |
| 4,270,130 | A | 5/1981 | Houle et al. |
| 4,271,395 | A | 6/1981 | Brinkmann et al. |
| 4,274,062 | A | 6/1981 | Brinkmann et al. |
| 4,289,957 | A | 9/1981 | Neyroud et al. |
| 4,301,091 | A | 11/1981 | Schieder et al. |
| 4,304,809 | A | 12/1981 | Moraw et al. |
| 4,313,984 | A | 2/1982 | Moraw et al. |
| 4,317,782 | A | 3/1982 | Eckstein et al. |
| 4,324,421 | A | 4/1982 | Moraw et al. |
| 4,326,066 | A | 4/1982 | Eckstein et al. |
| 4,338,258 | A | 7/1982 | Brinkwerth et al. |
| 4,356,052 | A | 10/1982 | Moraw et al. |
| 4,359,633 | A | 11/1982 | Bianco |
| 4,384,973 | A | 5/1983 | Harnisch |
| 4,415,225 | A | 11/1983 | Benton et al. |
| 4,417,784 | A | 11/1983 | Knop et al. |
| 4,428,997 | A | 1/1984 | Shulman |
| 4,443,438 | A | 4/1984 | Kasamatsu et al. |
| 4,450,024 | A | 5/1984 | Haghiri-Tehrani et al. |
| 4,467,209 | A | 8/1984 | Maurer et al. |
| 4,468,468 | A | 8/1984 | Benninghoven et al. |
| 4,506,148 | A | 3/1985 | Berthold et al. |
| 4,507,346 | A | 3/1985 | Maurer et al. |
| 4,510,311 | A | 4/1985 | Eckstein |
| 4,522,881 | A | 6/1985 | Kobayashi et al. |
| 4,523,777 | A | 6/1985 | Holbein et al. |
| 4,527,059 | A | 7/1985 | Benninghoven et al. |
| 4,529,992 | A | 7/1985 | Ishida et al. |
| 4,544,181 | A | 10/1985 | Maurer et al. |
| 4,551,265 | A | 11/1985 | Brinkwerth et al. |
| 4,568,824 | A | 2/1986 | Gareis et al. |
| 4,579,754 | A | 4/1986 | Maurer et al. |
| 4,590,366 | A | 5/1986 | Rothfjell |
| 4,596,409 | A | 6/1986 | Holbein et al. |
| 4,597,592 | A | 7/1986 | Maurer et al. |
| 4,597,593 | A | 7/1986 | Maurer |
| 4,599,259 | A | 7/1986 | Kobayashi et al. |
| 4,617,216 | A | 10/1986 | Haghiri-Tehrani et al. |
| 4,621,271 | A | 11/1986 | Brownstein |
| 4,627,997 | A | 12/1986 | Ide |
| 4,629,215 | A | 12/1986 | Maurer et al. |
| 4,638,289 | A | 1/1987 | Zottnik |
| 4,652,722 | A | 3/1987 | Stone et al. |
| 4,653,775 | A | 3/1987 | Raphael et al. |
| 4,653,862 | A | 3/1987 | Morozumi |
| 4,654,290 | A | 3/1987 | Spanjer |
| 4,656,585 | A | 4/1987 | Stephenson |
| 4,663,518 | A | 5/1987 | Borror et al. |
| 4,670,882 | A | 6/1987 | Telle et al. |
| 4,672,891 | A | 6/1987 | Maurer et al. |
| 4,675,746 | A | 6/1987 | Tetrick et al. |
| 4,687,526 | A | 8/1987 | Wilfert |
| 4,689,477 | A | 8/1987 | Goldman |
| 4,709,384 | A | 11/1987 | Schiller |
| 4,711,690 | A | 12/1987 | Haghiri-Tehrani |
| 4,732,410 | A | 3/1988 | Holbein et al. |
| 4,735,670 | A | 4/1988 | Maurer et al. |
| 4,738,949 | A | 4/1988 | Sethi et al. |
| 4,748,452 | A | 5/1988 | Maurer |
| 4,751,525 | A | 6/1988 | Robinson |
| 4,754,128 | A | 6/1988 | Takeda et al. |
| 4,765,656 | A | 8/1988 | Becker et al. |
| 4,766,026 | A | 8/1988 | Lass et al. |
| 4,773,677 | A | 9/1988 | Plasse |
| 4,790,566 | A | 12/1988 | Bossier et al. |
| 4,803,114 | A | 2/1989 | Schledorn |
| 4,816,372 | A | 3/1989 | Schenk et al. |
| 4,816,374 | A | 3/1989 | Lecomte |
| 4,822,973 | A | 4/1989 | Fahner et al. |
| 4,841,134 | A | 6/1989 | Hida et al. |
| 4,859,361 | A | 8/1989 | Reilley et al. |
| 4,861,620 | A | 8/1989 | Azuma et al. |
| 4,866,025 | A | 9/1989 | Byers et al. |
| 4,866,027 | A | 9/1989 | Henzel |
| 4,869,946 | A | 9/1989 | Clay |
| 4,871,714 | A | 10/1989 | Byers et al. |
| 4,876,234 | A | 10/1989 | Henzel |
| 4,876,237 | A | 10/1989 | Byers et al. |
| 4,878,167 | A | 10/1989 | Kapulka et al. |
| 4,879,747 | A | 11/1989 | Leighton et al. |
| 4,889,749 | A | 12/1989 | Ohashi et al. |
| 4,891,351 | A | 1/1990 | Byers et al. |
| 4,894,110 | A | 1/1990 | Lass et al. |
| 4,931,793 | A | 6/1990 | Fuhrmann et al. |
| 4,935,335 | A | 6/1990 | Fotland |
| 4,959,406 | A | 9/1990 | Foltin et al. |
| 4,968,063 | A | 11/1990 | McConville et al. |
| 4,972,476 | A | 11/1990 | Nathans |
| 4,990,759 | A | 2/1991 | Gloton et al. |
| 4,994,831 | A | 2/1991 | Marandi |
| 4,999,065 | A | 3/1991 | Wilfert |
| 5,005,872 | A | 4/1991 | Lass et al. |
| 5,005,873 | A | 4/1991 | West |
| 5,006,503 | A | 4/1991 | Byers et al. |
| 5,011,816 | A | 4/1991 | Byers et al. |
| 5,013,900 | A | 5/1991 | Hoppe |
| 5,024,989 | A | 6/1991 | Chiang et al. |
| 5,051,147 | A | 9/1991 | Anger |
| 5,058,926 | A | 10/1991 | Drower |
| 5,060,981 | A | 10/1991 | Fossum et al. |
| 5,061,341 | A | 10/1991 | Kildal et al. |
| 5,066,947 | A | 11/1991 | Du Castel |
| 5,075,195 | A | 12/1991 | Babler et al. |
| 5,079,411 | A | 1/1992 | Lee |
| 5,087,507 | A | 2/1992 | Heinzer |
| 5,089,350 | A | 2/1992 | Talvalkar et al. |
| 5,099,422 | A | 3/1992 | Foresman et al. |
| 5,100,711 | A | 3/1992 | Satake et al. |
| 5,113,445 | A | 5/1992 | Wang |
| 5,122,813 | A | 6/1992 | Lass et al. |
| 5,128,779 | A | 7/1992 | Mallik |
| 5,128,859 | A | 7/1992 | Carbone et al. |
| 5,138,070 | A | 8/1992 | Berneth |
| 5,138,604 | A | 8/1992 | Umeda et al. |
| 5,156,938 | A | 10/1992 | Foley et al. |
| 5,157,424 | A | 10/1992 | Craven et al. |
| 5,169,707 | A | 12/1992 | Faykish et al. |

| | | | |
|---|---|---|---|
| 5,171,625 | A | 12/1992 | Newton |
| 5,172,281 | A | 12/1992 | Ardis et al. |
| 5,173,840 | A | 12/1992 | Kodai et al. |
| 5,179,392 | A | 1/1993 | Kawaguchi |
| 5,180,309 | A | 1/1993 | Egnor |
| 5,191,522 | A | 3/1993 | Bosco et al. |
| 5,201,044 | A | 4/1993 | Frey, Jr. et al. |
| 5,208,450 | A | 5/1993 | Uenishi et al. |
| 5,215,864 | A | 6/1993 | Laakmann |
| 5,216,543 | A | 6/1993 | Calhoun |
| 5,224,173 | A | 6/1993 | Kuhns et al. |
| 5,233,513 | A | 8/1993 | Doyle |
| 5,237,164 | A | 8/1993 | Takada |
| 5,243,524 | A | 9/1993 | Ishida et al. |
| 5,249,546 | A | 10/1993 | Pennelle |
| 5,261,987 | A | 11/1993 | Luening et al. |
| 5,267,755 | A | 12/1993 | Yamauchi et al. |
| 5,270,526 | A | 12/1993 | Yoshihara |
| 5,272,039 | A | 12/1993 | Yoerger |
| 5,276,478 | A | 1/1994 | Morton |
| 5,284,364 | A | 2/1994 | Jain |
| 5,294,774 | A | 3/1994 | Stone |
| 5,294,944 | A | 3/1994 | Takeyama et al. |
| 5,298,922 | A | 3/1994 | Merkle et al. |
| 5,301,981 | A | 4/1994 | Nesis |
| 5,304,513 | A | 4/1994 | Haghiri-Tehrani et al. |
| 5,304,789 | A | 4/1994 | Lob et al. |
| 5,308,736 | A | 5/1994 | Defieuw et al. |
| 5,317,503 | A | 5/1994 | Inoue |
| 5,319,453 | A | 6/1994 | Copriviza et al. |
| 5,321,751 | A | 6/1994 | Ray et al. |
| 5,334,573 | A | 8/1994 | Schild |
| 5,336,657 | A | 8/1994 | Egashira et al. |
| 5,337,361 | A | 8/1994 | Wang et al. |
| 5,351,302 | A | 9/1994 | Leighton et al. |
| 5,374,675 | A | 12/1994 | Planchetta et al. |
| 5,379,345 | A | 1/1995 | Greenberg |
| 5,380,044 | A | 1/1995 | Aitkens et al. |
| 5,380,695 | A | 1/1995 | Chiang et al. |
| 5,384,846 | A | 1/1995 | Berson et al. |
| 5,386,566 | A | 1/1995 | Hamanaka et al. |
| 5,387,013 | A | 2/1995 | Yamauchi et al. |
| 5,393,099 | A | 2/1995 | D'Amato |
| 5,394,555 | A | 2/1995 | Hunter et al. |
| 5,396,559 | A | 3/1995 | McGrew |
| 5,409,797 | A | 4/1995 | Hosoi et al. |
| 5,410,142 | A | 4/1995 | Tsuboi et al. |
| 5,421,619 | A | 6/1995 | Dyball |
| 5,421,869 | A | 6/1995 | Gundjian et al. |
| 5,422,213 | A | 6/1995 | Yu et al. |
| 5,422,230 | A | 6/1995 | Boggs et al. |
| 5,424,119 | A | 6/1995 | Phillips et al. |
| 5,434,994 | A | 7/1995 | Shaheen et al. |
| 5,435,599 | A | 7/1995 | Bernecker |
| 5,436,970 | A | 7/1995 | Ray et al. |
| 5,446,659 | A | 8/1995 | Yamawaki |
| 5,449,200 | A | 9/1995 | Andric et al. |
| 5,450,504 | A | 9/1995 | Calia |
| 5,451,478 | A | 9/1995 | Boggs et al. |
| 5,454,598 | A | 10/1995 | Wicker |
| 5,455,947 | A | 10/1995 | Suzuki et al. |
| 5,458,713 | A | 10/1995 | Ojster |
| 5,463,212 | A | 10/1995 | Oshima et al. |
| 5,466,012 | A | 11/1995 | Puckett et al. |
| 5,471,533 | A | 11/1995 | Wang et al. |
| 5,474,875 | A | 12/1995 | Loerzer et al. |
| 5,483,442 | A | 1/1996 | Black et al. |
| 5,483,632 | A | 1/1996 | Kuwamoto et al. |
| 5,489,639 | A | 2/1996 | Faber et al. |
| 5,490,217 | A | 2/1996 | Wang et al. |
| 5,499,330 | A | 3/1996 | Lucas et al. |
| 5,504,674 | A | 4/1996 | Chen et al. |
| 5,505,494 | A | 4/1996 | Belluci et al. |
| 5,509,693 | A | 4/1996 | Kohls |
| 5,514,860 | A | 5/1996 | Berson |
| 5,516,362 | A | 5/1996 | Gundjian et al. |
| 5,522,623 | A | 6/1996 | Soules et al. |
| 5,523,125 | A | 6/1996 | Kennedy et al. |
| 5,523,942 | A | 6/1996 | Tyler et al. |
| 5,524,489 | A | 6/1996 | Twigg |
| 5,525,403 | A | 6/1996 | Kawabata et al. |
| 5,529,345 | A | 6/1996 | Kohls |
| 5,532,104 | A | 7/1996 | Goto |
| 5,534,372 | A | 7/1996 | Koshizuka et al. |
| 5,550,346 | A | 8/1996 | Andriash et al. |
| 5,550,976 | A | 8/1996 | Henderson et al. |
| 5,560,799 | A | 10/1996 | Jacobsen |
| 5,573,584 | A | 11/1996 | Ostertag et al. |
| 5,576,377 | A | 11/1996 | El Sayed et al. |
| 5,579,694 | A | 12/1996 | Mailloux |
| 5,586,310 | A | 12/1996 | Sharman |
| 5,629,093 | A | 5/1997 | Bischof et al. |
| 5,629,512 | A | 5/1997 | Haga |
| 5,633,119 | A | 5/1997 | Burberry et al. |
| 5,635,012 | A | 6/1997 | Belluci et al. |
| 5,636,292 | A | 6/1997 | Rhoads |
| 5,638,508 | A | 6/1997 | Kanai et al. |
| 5,639,819 | A | 6/1997 | Farkas et al. |
| 5,646,997 | A | 7/1997 | Barton |
| 5,652,626 | A | 7/1997 | Kawakami et al. |
| 5,654,105 | A | 8/1997 | Obringer et al. |
| 5,658,411 | A | 8/1997 | Faykish |
| 5,659,726 | A | 8/1997 | Sandford, II et al. |
| 5,669,995 | A | 9/1997 | Hong |
| 5,671,005 | A | 9/1997 | McNay et al. |
| 5,681,356 | A | 10/1997 | Barak et al. |
| 5,683,774 | A | 11/1997 | Faykish et al. |
| 5,688,738 | A | 11/1997 | Lu |
| 5,689,706 | A | 11/1997 | Rao et al. |
| 5,691,757 | A | 11/1997 | Hayashihara et al. |
| 5,694,471 | A | 12/1997 | Chen et al. |
| 5,696,705 | A | 12/1997 | Zykan |
| 5,697,006 | A | 12/1997 | Taguchi et al. |
| 5,698,296 | A | 12/1997 | Dotson |
| 5,700,037 | A | 12/1997 | Keller |
| 5,710,834 | A | 1/1998 | Rhoads |
| 5,712,731 | A | 1/1998 | Drinkwater et al. |
| 5,714,291 | A | 2/1998 | Marinello et al. |
| 5,717,018 | A | 2/1998 | Magerstedt et al. |
| 5,717,391 | A | 2/1998 | Rodriguez |
| 5,719,667 | A | 2/1998 | Miers |
| 5,719,948 | A | 2/1998 | Liang |
| 5,721,781 | A | 2/1998 | Deo et al. |
| 5,721,788 | A | 2/1998 | Powell et al. |
| 5,745,308 | A | 4/1998 | Spangenberg |
| 5,745,901 | A | 4/1998 | Entner et al. |
| 5,748,783 | A | 5/1998 | Rhoads |
| 5,760,386 | A | 6/1998 | Ward |
| 5,763,868 | A | 6/1998 | Kubota et al. |
| 5,764,263 | A | 6/1998 | Lin |
| 5,767,496 | A | 6/1998 | Swartz et al. |
| 5,768,001 | A | 6/1998 | Kelley et al. |
| 5,768,426 | A | 6/1998 | Rhoads |
| 5,768,505 | A | 6/1998 | Gilchrist et al. |
| 5,768,506 | A | 6/1998 | Randell |
| 5,769,301 | A | 6/1998 | Hebert et al. |
| 5,773,677 | A | 6/1998 | Lansink-Rotgerink et al. |
| 5,774,168 | A | 6/1998 | Blome |
| 5,776,278 | A | 7/1998 | Tuttle et al. |
| 5,783,024 | A | 7/1998 | Forkert |
| 5,786,587 | A | 7/1998 | Colgate, Jr. |
| 5,787,186 | A | 7/1998 | Schroeder |
| 5,787,269 | A | 7/1998 | Hyodo |
| 5,795,643 | A | 8/1998 | Steininger et al. |
| 5,797,134 | A | 8/1998 | McMillan et al. |
| 5,798,949 | A | 8/1998 | Kaub |

5,799,092 A 8/1998 Kristol et al.
5,801,857 A 9/1998 Heckenkamp et al.
5,808,758 A 9/1998 Solmsdorf
5,809,633 A 9/1998 Mundigl et al.
5,815,093 A 9/1998 Kikinis
5,815,292 A 9/1998 Walters
5,816,619 A 10/1998 Schaede
5,824,447 A 10/1998 Tavernier et al.
5,824,715 A 10/1998 Hayashihara et al.
5,832,481 A 11/1998 Sheffield
5,834,118 A 11/1998 Ranby et al.
5,840,142 A 11/1998 Stevenson et al.
5,840,791 A 11/1998 Magerstedt et al.
5,841,886 A 11/1998 Rhoads
5,844,685 A 12/1998 Gontin
5,853,955 A 12/1998 Towfiq
5,855,969 A 1/1999 Robertson
5,856,661 A 1/1999 Finkelstein et al.
5,861,662 A 1/1999 Candelore
5,862,260 A 1/1999 Rhoads
5,862,500 A 1/1999 Goodwin
5,864,622 A 1/1999 Marcus
5,864,623 A 1/1999 Messina et al.
5,866,644 A 2/1999 Mercx et al.
5,867,199 A 2/1999 Knox et al.
5,867,586 A 2/1999 Liang
5,870,711 A 2/1999 Huffman
5,872,627 A 2/1999 Miers
5,873,066 A 2/1999 Underwood et al.
5,877,707 A 3/1999 Kowalick
5,879,502 A 3/1999 Gustafson
5,879,784 A 3/1999 Breen et al.
5,888,624 A 3/1999 Haghiri et al.
5,892,661 A 4/1999 Stafford et al.
5,895,074 A 4/1999 Chess et al.
5,897,938 A 4/1999 Shinmoto et al.
5,907,149 A 5/1999 Marckini
5,907,848 A 5/1999 Zaiken et al.
5,909,683 A 6/1999 Miginiac et al.
5,912,767 A 6/1999 Lee
5,912,974 A 6/1999 Holloway et al.
5,919,853 A 7/1999 Condit et al.
5,925,500 A 7/1999 Yang et al.
5,928,989 A 7/1999 Ohnishi et al.
5,930,759 A 7/1999 Moore et al.
5,933,816 A 8/1999 Zeanah et al.
5,935,694 A 8/1999 Olmstead et al.
5,936,986 A 8/1999 Cantatore et al.
5,937,189 A 8/1999 Branson et al.
5,944,356 A 8/1999 Bergmann et al.
5,944,881 A 8/1999 Mehta et al.
5,947,369 A 9/1999 Frommer et al.
5,948,035 A 9/1999 Tomita
5,950,169 A 9/1999 Borghesi et al.
5,953,710 A 9/1999 Fleming
5,955,021 A 9/1999 Tiffany, III
5,955,961 A 9/1999 Wallerstein
5,956,687 A 9/1999 Wamsley et al.
5,958,528 A 9/1999 Bernecker
5,962,840 A 10/1999 Haghiri-Tehrani et al.
5,965,242 A 10/1999 Patton et al.
5,973,842 A 10/1999 Spangenberg
5,975,583 A 11/1999 Cobben et al.
5,977,514 A 11/1999 Feng et al.
5,982,912 A 11/1999 Fukui et al.
5,984,366 A 11/1999 Priddy
5,985,078 A 11/1999 Suess et al.
5,987,434 A 11/1999 Libman
5,988,820 A 11/1999 Huang et al.
5,991,429 A 11/1999 Coffin et al.
5,991,733 A 11/1999 Aleia et al.
6,000,607 A 12/1999 Ohki et al.
6,002,383 A 12/1999 Shimada
6,003,581 A 12/1999 Aihara
6,007,660 A 12/1999 Fockert
6,007,929 A 12/1999 Robertson et al.
6,009,402 A 12/1999 Whitworth
6,012,641 A 1/2000 Watada
6,016,225 A 1/2000 Anderson
6,017,972 A 1/2000 Harris et al.
6,022,905 A 2/2000 Harris et al.
6,024,287 A 2/2000 Takai et al.
6,025,462 A 2/2000 Wang et al.
6,028,134 A 2/2000 Zhang et al.
6,036,099 A 3/2000 Leighton
6,036,807 A 3/2000 Brongers
6,037,102 A 3/2000 Loerzer et al.
6,037,860 A 3/2000 Zander et al.
6,038,333 A 3/2000 Wang
6,038,393 A 3/2000 Iyengar et al.
6,042,249 A 3/2000 Spangenberg
6,043,813 A 3/2000 Stickney et al.
6,047,888 A 4/2000 Dethloff
6,049,055 A 4/2000 Fannash et al.
6,049,463 A 4/2000 O'Malley et al.
6,049,665 A 4/2000 Branson et al.
6,051,297 A 4/2000 Maier et al.
6,054,170 A 4/2000 Chess et al.
6,062,604 A 5/2000 Taylor et al.
6,064,414 A 5/2000 Kobayashi et al.
6,064,983 A 5/2000 Koehler
6,066,437 A 5/2000 Kösslinger
6,066,594 A 5/2000 Gunn et al.
6,071,855 A 6/2000 Patton et al.
6,072,894 A 6/2000 Payne
6,073,854 A 6/2000 Bravenec et al.
6,075,223 A 6/2000 Harrison
6,076,026 A 6/2000 Jambhekar et al.
6,081,832 A 6/2000 Gilchrist et al.
6,082,778 A 7/2000 Solmadorf
6,086,971 A 7/2000 Haas et al.
6,089,614 A 7/2000 Howland et al.
6,092,049 A 7/2000 Chislenko et al.
6,095,566 A 8/2000 Yamamoto et al.
6,100,804 A 8/2000 Brady et al.
6,105,007 A 8/2000 Norris
6,106,110 A 8/2000 Gundjian et al.
6,110,864 A 8/2000 Lu
6,111,506 A 8/2000 Yap et al.
6,111,517 A 8/2000 Atick et al.
6,115,690 A 9/2000 Wong
6,120,142 A 9/2000 Eltgen et al.
6,120,882 A 9/2000 Faykish et al.
6,122,403 A 9/2000 Rhoads
6,127,475 A 10/2000 Vollenberg et al.
6,134,582 A 10/2000 Kennedy
6,138,913 A 10/2000 Cyr et al.
6,141,611 A 10/2000 Mackey et al.
6,143,852 A 11/2000 Harrison et al.
6,146,032 A 11/2000 Dunham
6,146,741 A 11/2000 Ogawa et al.
6,151,403 A 11/2000 Luo
6,155,605 A 12/2000 Bratchley et al.
6,159,327 A 12/2000 Fockert
6,160,526 A 12/2000 Hirai et al.
6,160,903 A 12/2000 Hamid et al.
6,161,071 A 12/2000 Shuman et al.
6,162,160 A 12/2000 Ohshima et al.
6,163,770 A 12/2000 Gamble et al.
6,164,548 A 12/2000 Curiel
6,165,696 A 12/2000 Fischer
6,173,284 B1 1/2001 Brown
6,173,901 B1 1/2001 McCannel
6,174,400 B1 1/2001 Krutak, Sr. et al.
6,179,338 B1 1/2001 Bergmann et al.
6,183,018 B1 2/2001 Braun et al.

| | | | | |
|---|---|---|---|---|
| 6,184,782 | B1 | 2/2001 | Oda et al. | |
| 6,185,042 | B1 | 2/2001 | Lomb et al. | |
| 6,185,316 | B1 | 2/2001 | Buffam | |
| 6,185,490 | B1 | 2/2001 | Ferguson | |
| 6,185,540 | B1 | 2/2001 | Schreitmueller et al. | |
| 6,186,404 | B1 | 2/2001 | Ehrhart et al. | |
| 6,199,144 | B1 | 3/2001 | Arora et al. | |
| 6,202,932 | B1 | 3/2001 | Rapeli | |
| 6,206,292 | B1 | 3/2001 | Robertz et al. | |
| 6,207,344 | B1 | 3/2001 | Ramlow et al. | |
| 6,209,923 | B1 | 4/2001 | Thaxton et al. | |
| 6,210,777 | B1 | 4/2001 | Vermeulen et al. | |
| 6,214,916 | B1 | 4/2001 | Mercx et al. | |
| 6,214,917 | B1 | 4/2001 | Linzmeier et al. | |
| 6,219,639 | B1 | 4/2001 | Bakis et al. | |
| 6,221,552 | B1 | 4/2001 | Street et al. | |
| 6,223,125 | B1 | 4/2001 | Hall | |
| 6,226,623 | B1 | 5/2001 | Schein et al. | |
| 6,234,537 | B1 | 5/2001 | Gutmann et al. | |
| 6,236,975 | B1 | 5/2001 | Boe et al. | |
| 6,238,840 | B1 | 5/2001 | Hirayama et al. | |
| 6,238,847 | B1 | 5/2001 | Axtell, III et al. | |
| 6,243,480 | B1 | 6/2001 | Zhao et al. | |
| 6,244,514 | B1 | 6/2001 | Otto | |
| 6,246,933 | B1 | 6/2001 | Bague | |
| 6,247,644 | B1 | 6/2001 | Horne et al. | |
| 6,250,554 | B1 | 6/2001 | Leo et al. | |
| 6,254,127 | B1 | 7/2001 | Breed et al. | |
| 6,257,486 | B1 | 7/2001 | Teicher et al. | |
| 6,258,896 | B1 | 7/2001 | Abuelyaman et al. | |
| 6,259,506 | B1 | 7/2001 | Lawandy | |
| 6,260,029 | B1 | 7/2001 | Critelli | |
| 6,264,296 | B1 | 7/2001 | Klinefelter et al. | |
| 6,268,804 | B1 | 7/2001 | Janky et al. | |
| 6,277,232 | B1 | 8/2001 | Wang et al. | |
| 6,283,188 | B1 | 9/2001 | Maynard et al. | |
| 6,284,337 | B1 | 9/2001 | Lorimor et al. | |
| 6,286,761 | B1 | 9/2001 | Wen | |
| 6,289,108 | B1 | 9/2001 | Rhoads | |
| 6,291,551 | B1 | 9/2001 | Kniess et al. | |
| 6,292,092 | B1 | 9/2001 | Chow et al. | |
| 6,292,575 | B1 | 9/2001 | Bortolussi et al. | |
| 6,301,164 | B1 | 10/2001 | Manning et al. | |
| 6,301,363 | B1 | 10/2001 | Mowry, Jr. | |
| 6,302,444 | B1 | 10/2001 | Cobben | |
| 6,308,187 | B1 | 10/2001 | DeStefano | |
| 6,312,858 | B1 | 11/2001 | Yacobucci et al. | |
| 6,313,436 | B1 | 11/2001 | Harrison | |
| 6,316,538 | B1 | 11/2001 | Anderson et al. | |
| 6,324,091 | B1 | 11/2001 | Gryko et al. | |
| 6,326,128 | B1 | 12/2001 | Telser et al. | |
| 6,336,096 | B1 | 1/2002 | Jernberg | |
| 6,340,725 | B1 | 1/2002 | Wang et al. | |
| 6,341,169 | B1 | 1/2002 | Cadorette, Jr. et al. | |
| 6,343,138 | B1 | 1/2002 | Rhoads | |
| 6,345,104 | B1 | 2/2002 | Rhoads | |
| 6,351,893 | B1 | 3/2002 | St. Pierre | |
| 6,357,664 | B1 | 3/2002 | Zercher | |
| 6,363,360 | B1 | 3/2002 | Madden | |
| 6,368,684 | B1 | 4/2002 | Onishi et al. | |
| 6,372,394 | B1 | 4/2002 | Zientek | |
| 6,380,131 | B2 | 4/2002 | Griebel et al. | |
| 6,381,561 | B1 | 4/2002 | Bomar, Jr. et al. | |
| 6,389,151 | B1 | 5/2002 | Carr et al. | |
| 6,390,375 | B2 | 5/2002 | Kayanakis | |
| 6,397,334 | B1 | 5/2002 | Chainer et al. | |
| 6,400,386 | B1 | 6/2002 | No et al. | |
| 6,404,643 | B1 | 6/2002 | Chung | |
| 6,408,304 | B1 | 6/2002 | Kumhyr | |
| 6,413,687 | B1 | 7/2002 | Hattori et al. | |
| 6,418,154 | B1 | 7/2002 | Kneip et al. | |
| 6,421,013 | B1 | 7/2002 | Chung | |
| 6,424,029 | B1 | 7/2002 | Giesler | |
| 6,424,249 | B1 | 7/2002 | Houvener | |
| 6,427,744 | B2 | 8/2002 | Seki et al. | |
| 6,430,306 | B2 | 8/2002 | Slocum et al. | |
| 6,444,068 | B1 | 9/2002 | Koops et al. | |
| 6,444,377 | B1 | 9/2002 | Jotcham et al. | |
| 6,446,086 | B1 | 9/2002 | Bartlett et al. | |
| 6,446,865 | B1 | 9/2002 | Holt et al. | |
| 6,449,377 | B1 | 9/2002 | Rhoads | |
| 6,463,416 | B1 | 10/2002 | Messina | |
| 6,473,165 | B1 | 10/2002 | Coombs et al. | |
| 6,474,695 | B1 | 11/2002 | Schneider et al. | |
| 6,475,588 | B1 | 11/2002 | Schottland et al. | |
| 6,478,228 | B1 | 11/2002 | Ikefuji et al. | |
| 6,478,229 | B1 | 11/2002 | Epstein | |
| 6,482,495 | B1 | 11/2002 | Kohama et al. | |
| 6,485,319 | B2 | 11/2002 | Bricaud et al. | |
| 6,487,301 | B1 | 11/2002 | Zhao | |
| 6,493,650 | B1 | 12/2002 | Rodgers et al. | |
| 6,503,310 | B1 | 1/2003 | Sullivan | |
| 6,525,672 | B2 | 2/2003 | Chainer et al. | |
| 6,526,161 | B1 | 2/2003 | Yan | |
| 6,527,173 | B1 * | 3/2003 | Narusawa et al. ........... | 235/380 |
| 6,532,459 | B1 | 3/2003 | Berson | |
| 6,536,672 | B1 | 3/2003 | Outwater | |
| 6,546,112 | B1 | 4/2003 | Rhoads | |
| 6,555,213 | B1 | 4/2003 | Koneripalli et al. | |
| 6,570,609 | B1 | 5/2003 | Heien | |
| 6,581,839 | B1 | 6/2003 | Lasch et al. | |
| 6,583,813 | B1 | 6/2003 | Enright et al. | |
| 6,608,911 | B2 | 8/2003 | Lofgren et al. | |
| 6,614,914 | B1 | 9/2003 | Rhoads et al. | |
| 6,616,993 | B2 | 9/2003 | Usuki et al. | |
| 6,638,635 | B2 | 10/2003 | Hattori et al. | |
| 6,641,874 | B2 | 11/2003 | Kuntz et al. | |
| 6,675,074 | B2 | 1/2004 | Hathout et al. | |
| 6,681,032 | B2 | 1/2004 | Bortolussi et al. | |
| 6,685,312 | B2 | 2/2004 | Klinefelter et al. | |
| 6,702,282 | B2 | 3/2004 | Pribula et al. | |
| 6,712,397 | B1 | 3/2004 | Mayer et al. | |
| 6,715,797 | B2 | 4/2004 | Curiel | |
| 6,719,469 | B2 | 4/2004 | Yasui et al. | |
| 6,723,479 | B2 | 4/2004 | Van De Witte et al. | |
| 6,725,383 | B2 | 4/2004 | Kyle | |
| 6,729,719 | B2 | 5/2004 | Klinefelter et al. | |
| 6,751,336 | B2 | 6/2004 | Zhao | |
| 6,752,432 | B1 | 6/2004 | Richardson | |
| 6,758,616 | B2 | 7/2004 | Pribula et al. | |
| 6,764,014 | B2 | 7/2004 | Lasch et al. | |
| 6,769,061 | B1 | 7/2004 | Ahern | |
| 6,782,115 | B2 | 8/2004 | Decker et al. | |
| 6,782,116 | B1 | 8/2004 | Zhao et al. | |
| 6,783,024 | B2 | 8/2004 | Lee | |
| 6,794,115 | B2 | 9/2004 | Telser et al. | |
| 6,803,114 | B1 | 10/2004 | Vere et al. | |
| 6,817,530 | B2 | 11/2004 | Labrec et al. | |
| 6,818,699 | B2 | 11/2004 | Kajimaru et al. | |
| 6,825,265 | B2 | 11/2004 | Daga et al. | |
| 6,827,277 | B2 | 12/2004 | Bloomberg et al. | |
| 6,827,283 | B2 | 12/2004 | Kappe et al. | |
| 6,832,205 | B1 | 12/2004 | Aragones et al. | |
| 6,843,422 | B2 | 1/2005 | Jones et al. | |
| 6,853,739 | B2 | 2/2005 | Kyle | |
| 6,882,737 | B2 | 4/2005 | Lofgren et al. | |
| 6,900,767 | B2 | 5/2005 | Hattori | |
| 6,923,378 | B2 | 8/2005 | Jones et al. | |
| 6,925,468 | B1 | 8/2005 | Bobbitt et al. | |
| 6,938,029 | B1 | 8/2005 | Tien | |
| 6,942,331 | B2 | 9/2005 | Guillen et al. | |
| 6,952,741 | B1 | 10/2005 | Bartlett et al. | |
| 6,954,293 | B2 | 10/2005 | Heckenkamp et al. | |
| 6,961,708 | B1 | 11/2005 | Bierenbaum | |
| 6,963,659 | B2 | 11/2005 | Tumey et al. | |
| 6,970,844 | B1 | 11/2005 | Bierenbaum | |

| | | | | |
|---|---|---|---|---|
| 6,978,036 | B2 | 12/2005 | Alattar et al. | |
| 7,013,284 | B2 | 3/2006 | Guyan | |
| 7,016,516 | B2 | 3/2006 | Rhoads | |
| 7,024,418 | B1 | 4/2006 | Childress et al. | |
| 7,043,052 | B2 | 5/2006 | Rhoads | |
| 7,063,264 | B2 | 6/2006 | Bi et al. | |
| 7,081,282 | B2 | 7/2006 | Kuntz et al. | |
| 7,086,666 | B2 | 8/2006 | Richardson | |
| 7,095,426 | B1 | 8/2006 | Childress | |
| 7,143,950 | B2 | 12/2006 | Jones et al. | |
| 7,183,361 | B2 | 2/2007 | Toman | |
| 7,196,813 | B2 | 3/2007 | Matsumoto | |
| 7,197,444 | B2 | 3/2007 | Bomar, Jr. et al. | |
| 7,199,456 | B2 | 4/2007 | Krappe et al. | |
| 7,202,970 | B1 | 4/2007 | Maher et al. | |
| 7,207,494 | B2 * | 4/2007 | Theodossiou et al. | 235/487 |
| 7,277,891 | B2 | 10/2007 | Howard et al. | |
| 7,278,580 | B2 | 10/2007 | Jones et al. | |
| 7,343,307 | B1 | 3/2008 | Childress | |
| 7,344,325 | B2 | 3/2008 | Meier et al. | |
| 7,353,196 | B1 | 4/2008 | Bobbitt et al. | |
| 7,356,541 | B1 | 4/2008 | Doughty | |
| 7,359,863 | B1 | 4/2008 | Evenshaug et al. | |
| 7,363,264 | B1 | 4/2008 | Doughty et al. | |
| 7,398,219 | B1 | 7/2008 | Wolfe | |
| 7,418,400 | B1 | 8/2008 | Lorenz | |
| 7,430,514 | B1 | 9/2008 | Childress et al. | |
| 7,430,515 | B1 | 9/2008 | Wolfe et al. | |
| 7,498,075 | B2 | 3/2009 | Bloomberg et al. | |
| 7,526,487 | B1 | 4/2009 | Bobbitt et al. | |
| 2001/0002035 | A1 | 5/2001 | Kayanakis | |
| 2001/0013395 | A1 | 8/2001 | Pourmand et al. | |
| 2001/0037223 | A1 | 11/2001 | Beery et al. | |
| 2001/0037455 | A1 | 11/2001 | Lawandy et al. | |
| 2002/0007289 | A1 | 1/2002 | Malin et al. | |
| 2002/0018430 | A1 | 2/2002 | Heckenkamp et al. | |
| 2002/0020832 | A1 | 2/2002 | Oka | |
| 2002/0021001 | A1 | 2/2002 | Stratford et al. | |
| 2002/0027359 | A1 | 3/2002 | Cobben et al. | |
| 2002/0030587 | A1 | 3/2002 | Jackson | |
| 2002/0034319 | A1 | 3/2002 | Tumey et al. | |
| 2002/0035488 | A1 | 3/2002 | Aquila et al. | |
| 2002/0049619 | A1 | 4/2002 | Wahlbin et al. | |
| 2002/0055860 | A1 | 5/2002 | Wahlbin et al. | |
| 2002/0055861 | A1 | 5/2002 | King et al. | |
| 2002/0059083 | A1 | 5/2002 | Wahlbin et al. | |
| 2002/0059084 | A1 | 5/2002 | Wahlbin et al. | |
| 2002/0059085 | A1 | 5/2002 | Wahlbin et al. | |
| 2002/0059086 | A1 | 5/2002 | Wahlbin et al. | |
| 2002/0059087 | A1 | 5/2002 | Wahlbin et al. | |
| 2002/0059097 | A1 | 5/2002 | Wahlbin et al. | |
| 2002/0062232 | A1 | 5/2002 | Wahlbin et al. | |
| 2002/0062233 | A1 | 5/2002 | Wahlbin et al. | |
| 2002/0062234 | A1 | 5/2002 | Wahlbin et al. | |
| 2002/0062235 | A1 | 5/2002 | Wahlbin et al. | |
| 2002/0069091 | A1 | 6/2002 | Wahlbin et al. | |
| 2002/0069092 | A1 | 6/2002 | Wahlbin et al. | |
| 2002/0070280 | A1 | 6/2002 | Ikefuji et al. | |
| 2002/0077380 | A1 | 6/2002 | Wessels et al. | |
| 2002/0080992 | A1 | 6/2002 | Decker et al. | |
| 2002/0080994 | A1 | 6/2002 | Lofgren et al. | |
| 2002/0082873 | A1 | 6/2002 | Wahlbin et al. | |
| 2002/0087363 | A1 | 7/2002 | Wahlbin et al. | |
| 2002/0106494 | A1 | 8/2002 | Roth et al. | |
| 2002/0116330 | A1 | 8/2002 | Hed et al. | |
| 2002/0128881 | A1 | 9/2002 | Wahlbin et al. | |
| 2002/0136448 | A1 | 9/2002 | Bortolussi et al. | |
| 2002/0145652 | A1 | 10/2002 | Lawrence et al. | |
| 2002/0146549 | A1 | 10/2002 | Kranenburg-Van Dijk et al. | |
| 2002/0166635 | A1 | 11/2002 | Sasaki et al. | |
| 2002/0170966 | A1 | 11/2002 | Hannigan et al. | |
| 2002/0187215 | A1 | 12/2002 | Trapani et al. | |
| 2002/0194476 | A1 | 12/2002 | Lewis et al. | |
| 2003/0002710 | A1 | 1/2003 | Rhoads | |
| 2003/0031340 | A1 | 2/2003 | Alattar et al. | |
| 2003/0031348 | A1 | 2/2003 | Kuepper et al. | |
| 2003/0034319 | A1 | 2/2003 | Meherin et al. | |
| 2003/0038174 | A1 | 2/2003 | Jones | |
| 2003/0052680 | A1 | 3/2003 | Konijn | |
| 2003/0055638 | A1 | 3/2003 | Burns et al. | |
| 2003/0056499 | A1 | 3/2003 | Binder et al. | |
| 2003/0056500 | A1 | 3/2003 | Huynh et al. | |
| 2003/0059124 | A1 | 3/2003 | Center, Jr. | |
| 2003/0062421 | A1 | 4/2003 | Bloomberg et al. | |
| 2003/0099379 | A1 | 5/2003 | Monk et al. | |
| 2003/0114972 | A1 | 6/2003 | Takafuji et al. | |
| 2003/0115459 | A1 | 6/2003 | Monk | |
| 2003/0117262 | A1 | 6/2003 | Anderegg et al. | |
| 2003/0126121 | A1 | 7/2003 | Khan et al. | |
| 2003/0128862 | A1 | 7/2003 | Decker et al. | |
| 2003/0141358 | A1 | 7/2003 | Hudson et al. | |
| 2003/0161507 | A1 | 8/2003 | Lawandy | |
| 2003/0173406 | A1 | 9/2003 | Bi et al. | |
| 2003/0178487 | A1 | 9/2003 | Rogers | |
| 2003/0178495 | A1 | 9/2003 | Jones et al. | |
| 2003/0183695 | A1 | 10/2003 | Labrec et al. | |
| 2003/0200123 | A1 | 10/2003 | Burge et al. | |
| 2003/0211296 | A1 | 11/2003 | Jones et al. | |
| 2003/0226897 | A1 | 12/2003 | Jones et al. | |
| 2003/0234286 | A1 | 12/2003 | Labrec et al. | |
| 2003/0234292 | A1 | 12/2003 | Jones | |
| 2004/0011874 | A1 | 1/2004 | Theodossiou et al. | |
| 2004/0024694 | A1 | 2/2004 | Lawrence et al. | |
| 2004/0030587 | A1 | 2/2004 | Danico | |
| 2004/0036574 | A1 | 2/2004 | Bostrom | |
| 2004/0049409 | A1 | 3/2004 | Wahlbin et al. | |
| 2004/0054556 | A1 | 3/2004 | Wahlbin et al. | |
| 2004/0054557 | A1 | 3/2004 | Wahlbin et al. | |
| 2004/0054558 | A1 | 3/2004 | Wahlbin et al. | |
| 2004/0054559 | A1 | 3/2004 | Wahlbin et al. | |
| 2004/0066441 | A1 | 4/2004 | Jones et al. | |
| 2004/0074973 | A1 | 4/2004 | Schneck et al. | |
| 2004/0076310 | A1 | 4/2004 | Hersch et al. | |
| 2004/0093349 | A1 | 5/2004 | Buinevicius et al. | |
| 2004/0102984 | A1 | 5/2004 | Wahlbin et al. | |
| 2004/0102985 | A1 | 5/2004 | Wahlbin et al. | |
| 2004/0103004 | A1 | 5/2004 | Wahlbin et al. | |
| 2004/0103005 | A1 | 5/2004 | Wahlbin et al. | |
| 2004/0103006 | A1 | 5/2004 | Wahlbin et al. | |
| 2004/0103007 | A1 | 5/2004 | Wahlbin et al. | |
| 2004/0103008 | A1 | 5/2004 | Wahlbin et al. | |
| 2004/0103009 | A1 | 5/2004 | Wahlbin et al. | |
| 2004/0103010 | A1 | 5/2004 | Wahlbin et al. | |
| 2004/0111301 | A1 | 6/2004 | Wahlbin et al. | |
| 2004/0133582 | A1 | 7/2004 | Howard et al. | |
| 2004/0198858 | A1 | 10/2004 | Labrec | |
| 2004/0213437 | A1 | 10/2004 | Howard et al. | |
| 2004/0243567 | A1 | 12/2004 | Levy | |
| 2004/0245346 | A1 | 12/2004 | Haddock | |
| 2005/0001419 | A1 | 1/2005 | Levy et al. | |
| 2005/0003297 | A1 | 1/2005 | Labrec | |
| 2005/0010776 | A1 | 1/2005 | Kenen | |
| 2005/0035589 | A1 | 2/2005 | Richardson | |
| 2005/0060205 | A1 | 3/2005 | Woods et al. | |
| 2005/0072849 | A1 | 4/2005 | Jones | |
| 2005/0095408 | A1 | 5/2005 | Labrec et al. | |
| 2005/0160294 | A1 | 7/2005 | LaBrec et al. | |
| 2005/0192850 | A1 | 9/2005 | Lorenz | |
| 2006/0027667 | A1 | 2/2006 | Jones et al. | |
| 2006/0039581 | A1 | 2/2006 | Decker et al. | |
| 2007/0152067 | A1 | 7/2007 | Bi et al. | |
| 2007/0158939 | A1 | 7/2007 | Jones et al. | |

2007/0187515 A1 8/2007 Theodossiou et al.

FOREIGN PATENT DOCUMENTS

| | | | |
|---|---|---|---|
| CA | 2469956 | | 7/2003 |
| CN | 1628318 | | 6/2005 |
| DE | 2943436 | | 5/1981 |
| DE | 3738636 | | 6/1988 |
| DE | 9315294 | | 3/1994 |
| DE | 69406213 | | 3/1998 |
| EP | 0157568 | | 10/1985 |
| EP | 190997 | | 8/1986 |
| EP | 0233296 | | 8/1987 |
| EP | 0279104 | | 8/1988 |
| EP | 0280773 | | 9/1988 |
| EP | 0356980 | | 3/1990 |
| EP | 0356981 | | 3/1990 |
| EP | 0356982 | | 3/1990 |
| EP | 0362640 | | 4/1990 |
| EP | 0336075 | A | 5/1990 |
| EP | 0366923 | | 5/1990 |
| EP | 0373572 | | 6/1990 |
| EP | 0374835 | | 6/1990 |
| EP | 0420613 | | 4/1991 |
| EP | 0446834 | | 6/1991 |
| EP | 0446846 | | 9/1991 |
| EP | 0465018 | | 1/1992 |
| EP | 0479265 | | 4/1992 |
| EP | 0523304 | | 1/1993 |
| EP | 0539001 | | 4/1993 |
| EP | 629972 | | 12/1994 |
| EP | 0636495 | | 2/1995 |
| EP | 0637514 | | 2/1995 |
| EP | 0649754 | | 4/1995 |
| EP | 0696518 | | 2/1996 |
| EP | 697433 | | 2/1996 |
| EP | 0734870 | | 10/1996 |
| EP | 0736860 | | 10/1996 |
| EP | 0739748 | | 10/1996 |
| EP | 642060 | B1 | 3/1999 |
| EP | 09226608 | | 6/1999 |
| EP | 0982149 | | 3/2000 |
| EP | 0991014 | | 4/2000 |
| EP | 1013463 | | 6/2000 |
| EP | 1017016 | | 7/2000 |
| EP | 1035503 | | 9/2000 |
| EP | 1046515 | | 10/2000 |
| EP | 1110750 | A | 6/2001 |
| EP | 0464268 | | 1/2002 |
| EP | 1410315 | | 5/2006 |
| EP | 1909971 | B1 | 4/2008 |
| GB | 1088318 | | 10/1967 |
| GB | 1213193 | | 11/1970 |
| GB | 1472581 | | 5/1977 |
| GB | 2132136 | | 7/1984 |
| GB | 2227570 | | 8/1990 |
| GB | 2240948 | | 8/1991 |
| JP | 63146909 | | 6/1988 |
| JP | 03126589 | | 5/1991 |
| JP | 3185585 | | 8/1991 |
| JP | 6234289 | | 8/1994 |
| JP | 7088974 | | 4/1995 |
| JP | 09064545 | A | 3/1997 |
| JP | 10197285 | | 7/1998 |
| JP | 10214283 | | 8/1998 |
| JP | 11161711 | | 6/1999 |
| JP | 11259620 | | 9/1999 |
| JP | 11301121 | | 11/1999 |
| JP | 11321166 | | 11/1999 |
| JP | 2004355659 | | 12/2004 |
| JP | 2005525254 | | 8/2005 |
| JP | 2005525949 | | 9/2005 |
| JP | 2005276238 | | 10/2005 |
| JP | 2006190331 | | 7/2006 |
| WO | WO 82/04149 | | 11/1982 |
| WO | WO 89/00319 | | 1/1989 |
| WO | WO 91/16722 | | 10/1991 |
| WO | WO 95/13597 | | 5/1995 |
| WO | WO 96/03286 | | 2/1996 |
| WO | WO97/01446 | | 1/1997 |
| WO | WO 97/18092 | | 5/1997 |
| WO | WO 97/32733 | | 9/1997 |
| WO | WO98/19869 | | 5/1998 |
| WO | WO 98/30224 | | 7/1998 |
| WO | WO 99/24934 | | 5/1999 |
| WO | WO 00/10116 | | 2/2000 |
| WO | WO 00/43214 | | 7/2000 |
| WO | WO 00/43215 | | 7/2000 |
| WO | WO00/43216 | | 7/2000 |
| WO | WO/00/45344 | | 8/2000 |
| WO | WO 00/78554 | | 12/2000 |
| WO | WO 01/00719 | | 1/2001 |
| WO | WO 01/29764 | A1 | 4/2001 |
| WO | WO 01/45559 | | 6/2001 |
| WO | WO 01/56805 | | 8/2001 |
| WO | WO 01/95249 | | 12/2001 |
| WO | WO 02/26507 | A1 | 4/2002 |
| WO | WO 02/27647 | A1 | 4/2002 |
| WO | WO 02/42371 | | 5/2002 |
| WO | WO 02/45969 | | 6/2002 |
| WO | WO 02/52499 | | 7/2002 |
| WO | WO 02/53499 | | 7/2002 |
| WO | WO 02/78965 | A1 | 10/2002 |
| WO | WO 02/96666 | | 12/2002 |
| WO | WO 03/05291 | | 1/2003 |
| WO | WO 03/30079 | | 4/2003 |
| WO | WO03/055684 | | 7/2003 |
| WO | WO 03/56500 | | 7/2003 |
| WO | WO 03/56507 | | 7/2003 |
| WO | WO 03/95210 | | 11/2003 |
| WO | WO 03/96258 | | 11/2003 |
| WO | WO 2004/034236 | | 4/2004 |
| WO | WO 2004/049242 | | 6/2004 |

OTHER PUBLICATIONS

PCT—Notification of Transmittal of the International Search Report or the Declaration and International Search Report for International Application No. PCT/US02/41644, mailed on May 30, 2003.
U.S. Appl. 60/344,673, filed Dec. 24, 2001, Regan.
U.S. Appl. 60/344,674, filed Dec. 24, 2001, Jones.
U.S. Appl. 60/344,675, filed Dec. 24, 2001, Labrec.
U.S. Appl. 60/344,676, filed Dec. 24, 2001, Labrec.
U.S. Appl. 60/344,677, filed Dec. 24, 2001, Labrec et al.
U.S. Appl. 60/344,682, filed Dec. 24, 2001, Lopolito.
U.S. Appl. 60/344,683, filed Dec. 24, 2001, Labrec.
U.S. Appl. 60/344,683, filed Dec. 24, 2001, Labrec.
U.S. Appl. 60/344,685, filed Dec. 24, 2001, Bi et al.
U.S. Appl. 60/344,686, filed Dec. 24, 2001, Jones.
U.S. Appl. 60/344,687, filed Dec. 24, 2001, Bloomberg.
U.S. Appl. 60/344,688, filed Dec. 24, 2001, Rice.
U.S. Appl. 60/344,698, filed Dec. 24, 2001, Bloomberg.
U.S. Appl. 60/344,709, filed Dec. 24, 2001, Labrec.
U.S. Appl. 60/344,710, filed Dec. 24, 2001, Jones et al.
U.S. Appl. 60/344,716, filed Dec. 24, 2001, Theodossiou.
U.S. Appl. 60/344,717, filed Dec. 24, 2001, Regan.
U.S. Appl. 60/344,718, filed Dec. 24, 2001, LaBrec.
U.S. Appl. 60/344,719, filed Dec. 24, 2001, Bi.
U.S. Appl. 60/344,753, filed Dec. 24, 2001, Rice.
U.S. Appl. 60/358,321, filed Feb. 19, 2002, Munday et al.
U.S. Appl. 60/371,335, filed Apr. 9, 2002, Schneck.
U.S. Appl. 60/379,646, filed May 10, 2002, Mailloux et al.
U.S. Appl. 60/379,704, filed May 10, 2002, Bi et al.
U.S. Appl. 60/410,544, filed Sep. 13, 2002, Haigh.
U.S. Appl. 60/418,129, filed Oct. 11, 2002, Howard.
U.S. Appl. 60/418,762, filed Oct. 15, 2002, Rhoads.

U.S. Appl. 60/421,254, filed Oct. 25, 2002, Rhoads.
U.S. Appl. 60/429,115, filed Nov. 25, 2002, Jones.
U.S. Appl. 60/447,502, filed Feb. 13, 2003, Haigh.
U.S. Appl. 60/451,840, filed Mar. 3, 2003, Levy.
U.S. Appl. 60/459,284, filed Mar. 31, 2003, Jones.
@Fault: Improve Claims Practices Through Greater consistency in Fault Assessment, Computer Sciences corporation, pp. 2, 2004. (g53).
"@ Fault A Commitment to Consistency," Computer Sciences Corporation, Copyright 2000, pp. 1-2.
"About Card Printing How it Works", http://www.racoindustries.com/aboutcardp5.htm., pp. 1-3 (Dec. 22, 2002).
"Accident Reconstruction Software Maine Computer Group," Maine Computer Group, Copyright 2001, updated Oct. 1, 2001, Accessed Oct. 29, 2001, pp. 1-2.
"ADP CSG: Integrated Medical Solutions," ADP Claims Solutions Group, Copyright 2001, Accessed Oct. 30, 2001, p. 1.
"Authentication and Security Technologies," I/O Software, Inc., Accessed Oct. 10, 2002, 4 pages.
"Biometric Access Control System, Face and Fingerprint Recognition," BioAxs 9800, not dated 4 pages.
"CSC Expands Cost Containment Solutions for Claims and Legal Expenses," Computer Sciences Corporation, Jun. 27, 2001, El Segundo, CA, pp. 1-2.
"CSC Files Suit to protect Intellectual Property", PR Newswire, New York: Jan. 12, 2000, p. 1.
"CSC Introduces Liability Assessment Tool to Improve Claims Consistency," Computer Science Corporation, Oct. 31, 2001, pp. 1-2.
"CSC: Solutions Search," Computer Sciences Corporation, Copyright 2001, Accessed Oct. 30, 2001 p. 1.
"FaceIt Identification SDK," Identix, Inc., Accessed Oct. 7, 2002, 2 pages.
"FaceIt an Award-Winning Facial Recognition Software Engine," Visionics, not dated, 1 page.
"Facial Scan Technology: How it works," Facial-Scan, 1999, 4 pages.
"Facial Scan Vendors and Links," Facial-Scan, 1999, 3 pages.
"Frequently Asked Questions," FaceIt software, Accessed Oct. 10, 2002, 13 pages.
1D-2000-Image Detection & Biometric Facial Recognition,* 2000, 3 pages.
"Identification Solutions-Driver's Licenses and passports," Image Technologies, Copyright 2001-2002, Accessed Oct. 10, 2002, 1 page.
"IMS ICE," ADP Integrated Medical Solutions, Copyright 2001, Rockville, MD, pp. 1-6.
"Insurance Services Office Strengthens Claims Handling Team," ISO Properties, Inc., Copyright 1996, Accessed Jul. 13, 2009, Jersey City, NJ, pp. 1-3.
"Introducing Smart CCTV," FaceIt, Visionics, 2000, 8 pages.
"ISO Claims Outcome Advisor," ISO Properties, Inc., Copyright 1996, Accessed Oct. 30, 2001, Jersey City, NJ, pp. 1-2.
"ISO to Acquire Claims Outcome Advisor from Computer Sciences and MYND," Dec. 21, 2000, accessed at www.swampfox.ws.
"Lenticular - How it Works", The Vision - Sales Articles from 1998.
"Lenticular Prints", http://www.shortcourses.com/how/lenticular/lentcular.htm, pp. 1-6 (Dec. 16, 2002).
"Multi-Modal Biometrics Authentication System," findbiometrics.com - Multimodal Biometrics Guides and Articles, Oct. 9, 2003, 4 pages.
"Polaroid's Polaprime UV Invisible Ink System Winks at Hollywood As Godzilla's Eye in Promo Display", http://www.polaroid.com/polinfo/press_releases/august98/080598a.html., pp. 1-2 (Nov. 26, 2002).
"Policy Management Systems Corporation Announces Pilot Licensing of Claims Outcome Advisor™ to Blue Ridge Insurance Co.," PR Newswire. New York; Aug. 24, 1999, p. 1.
REC-TEC Accident Reconstruction and Analysis Computer Software, George M. Bonnett, Nov. 2001, Rockledge, FL, pp. 1-5.
"REC-TEC Accident Reconstruction Software," George M. Bonnett, Sep. 2001, Rockledge Ll, pp. 1-10.
"Secure ID Center: Design a Secure ID card Key technologies for a secure ID", http://www.datacard.com/secureid/securei_card_technologies_features.shtm. pp. 1-5 (Dec. 12, 2002).
"Technologies Overview", http://www.nfive.com/Articles/2.htm, pp. 1-2 (Dec. 22, 2002).
"U.S. Unveils New $20 Note With Background Colors", U.S. Bureau of Engraving and Printing New Money Media Center, 2 pages (Jul. 28, 2003).
"We're Watching Out for You," Business Solution, Accessed Oct. 10, 2002, 3 pages.
"Welcome to Orasee Corporation", http://www.orasee.com/one/main.php3, pp. 1-2, (Dec. 13, 2002).
"What are 'Dye Sublimation Thermal Printers'? (Technology)" http://www.nfive.com/Articles/2.htm., pp. 1-2 (Dec. 22, 2002).
Amended claims from WO/056507, corresponding to those in EP 02 805 980.6, Apr. 24, 2008.
Appeal Brief filed Apr. 11, 2008 and Examiner's Answer dated May 7, 2008 from U.S. Appl. No. 10/893,149.
Aug. 16, 2007 communication from the Canadian Intellectual Property Office in Application No. 2,470,600, and a Feb. 15, 2008 Amendment in response thereto.
Baker, "Don't Throw Your Adjusters to the Lions", *Best's Review*, 95(12):66-69 (1995).
Banking Connections, Computer Sciences Corporation, Apr./May 1999, 44 pages.
Banking Connections, Computer Sciences Corporation, Apr./May 2000, 48 pages.
Banking Connections, Computer Sciences Corporation, Aug./Sep. 1999, 52 pages.
Banking Connections, Computer Sciences Corporation, Dec. 1999, 48 pages.
Banking Connections, Computer Sciences Corporation, Nov./Dec. 2000, 48 pages.
Borland, "Running Microsoft Outlook 97", *Microsoft Press*, (1997).
Canadian Patent application 2,469,938, claims as filed, with effective filing date of Dec. 20, 2002, 10 pages.
Canadian Patent application 2,469,938, Office Action dated Jul. 24, 2006, 2 pages.
Chow et al., "Forgery and Temper-Proof Identification Document," *IEEE Proc. 1993 Int. Camahan Conf. On Security Technology*, 11-14 (1993).
CIGNA P&C Opens National Premises Liability Center, Mar. 1999, PR Newswire, p. 1.
Clariant Masterbatches Division Price Quotation #474938, Nov. 30, 2000, 2 pages.
Clariant Masterbatches, pricing, #762998, Jan. 9, 2004, 2 pages.
Connections to the Americas, vol. 3, No. 1, CSC Continuum, Jan. 1997, 55 pages.
Connections to the Americas, vol. 3, No. 2, CSC Continuum, Feb. 1997, 55 pages.
Connections to the Americas, vol. 3, No. 3, CSC Continuum, Mar. 1997, 48 pages.
Connections to the Americas, vol. 3, No. 4, CSC Continuum, Apr. 1997, 40 pages.
Connections to the Americas, vol. 3, No. 5, Computer Sciences Corporation, May/Jun. 1997, 66 pages.
Connections to the Americas, vol. 3, No. 6, Computer Sciences Corporation, Jul./Aug. 1997, 56 pages.
Connections to the Americas, vol. 3, No, 7, Computer Sciences Corporation, Sep./Oct. 1997, 76 pages.
Connections to the Americas, vol. 4, No. 1, Computer Sciences Corporation, Jan. 1998, 64 pages.
Connections to the Americas, vol. 4, No. 2, Computer Sciences Corporation, Feb./Mar. 1998, 50 pages.
Connections to the Americas, vol. 4, No. 3, Computer Sciences Corporation, .May/Jun. 1998, 48 pages.
Connections to the Americas, vol. 4, No. 4, Computer Sciences Corporation, Sep./Oct. 1998, 62 pages.
Connections, Computer Sciences Corporation, Dec. 2001, 39 pages.
Connections, Computer Sciences Corporation, Jun. 2001, 44 pages.
Connections, Computer Sciences Corporation, Mar./Apr. 2001, 44 pages.
Connections, Computer Sciences Corporation, Oct. 2001, 39 pages.
Continuum Connections to the Americas, vol. 1, No. 1, The Continuum Company, Inc., Sept. 1995, 49 pages.

Continuum Connections to the Americas, vol. 2, No. 1, The Continuum Company, Inc., Jan. 1996, 59 pages.
Continuum Connections to the Americas, vol. 2, No. 2, The Continuum Company, Inc., Mar. 1996, 59 pp.
Continuum Connections to the Americas, vol. 2, No. 3, The Continuum Company, Inc., May 1996, 51 pages.
Continuum Connections to the Americas, vol. 2, No. 4, The Continuum Company, Inc., Jul. 1996, 55 pages.
Continuum Connections to the Americas, vol. 2, No. 5, The Continuum Company, Inc., Sept. 1996, 59 pages.
Continuum Connections, vol. I, No. 1, The Continuum Company, Inc., Nov. 1991, 16 pages.
Continuum Connections, vol. I, No. 2, The Continuum Company, Inc., Jan./Feb. 1992, 17 pages.
Continuum Connections, vol. 1, No. 3, The Continuum Company, Inc., Mar./Apr. 1992, 16 pages.
Continuum Connections, vol. I, No. 4, The Continuum Company, Inc., Jul./Aug. 1992, 15 pages.
Continuum Connections, vol. II, No. 1, The Continuum Company, Inc., Oct/Nov. 1992, 16 pages.
Continuum Connections, vol. II, No. 2, The Continuum Company, Inc., Dec./Jan. 1993, 24 pages.
Continuum Connections, vol. II, No. 3, The Continuum Company, Inc., Mar./Apr. 1993, 16 pages.
Continuum Connections, vol. II, No. 4, The Continuum Company, Inc., Jul./Aug. 1993, 16 pages.
Continuum Connections, vol. II, No. 5, The Continuum Company, Inc., Nov./Dec. 1993, 20 pages.
Continuum Connections, vol. II, No. 6, The Continuum Company, Inc., Jan./Feb. 1994, 19 pages.
Continuum Connections, vol. III, No. 1, The Continuum Company, Inc., Mar./Apr. 1994, 24 pages.
Continuum Connections, vol. III, No. 2, The Continuum Company, Inc., Nov./Dec. 1994, 20 pages.
Continuum Connections, vol. III, No. 3, The Continuum Company, Inc., Mar./Apr. 1995, 16 pages.
Continuum Connections, vol. III, No. 4, The Continuum Company, Inc., Oct./Nov. 1995, 24 pages.
Cost Containment: Products and Solutions for the Property and Casualty Insurance Industry, Computer Science Corporation, Oct. 1999, 40 pages.
Datacard DCL30, "The Most Secure Card Personalization System for ID Programs," 2002, 3 pages.
Davis, "Knowledge on the Beat," Jul. 1999, Knowledge Management Magazine, www.destinationkm.com.
Ditek@http://www.archive.org/web/20000301124742/www.ditec.com, last viewed on Nov. 28, 2005.
effekte, "Plastics on the Rise", Mar. 2001, 12 pages.
EM Industries Inc., Lazer Flair LS Series Pigments, Dec. 11, 2002, 3 pages.
EP 01992398.6 first examination report, dated Jan. 7, 2005.
EP 01992398.6 notice of grant, dated Nov. 28, 2005.
EP 01992398.6 response to first examination report , dated Jul. 18, 2005.
EP02797041.7 Search Report, March 19, 2007, 3 pages.
EP02797041.7, communication pursuant to Article 94(3) EPC, dated Dec. 28, 2007, of related EP counterpart application, 6 pages.
Esters, "Computers Can Help Settle Auto Claims" Apr. 28, 1997, National Underwriter. vol. 101, Iss. 17, p. 10.
Examiner's Report dated May 2, 2006, from CA Application No. 2,470,600 (corresponding to PCT/US02/41681; Published as WO03/056507).
FaceIt, "Real Time Facial Surveillance and Identification System," Accessed Oct. 10, 2002, 5 pages.
FaceIt-Hands off, continuous and in real-time, Visionics, 1 page.
Final Rejection, U.S. Appl. No. 10/836,639, Bi et al., filed Apr. 29, 2004, mailed Apr. 1, 2008.
Final Rejection, U.S. Appl. No. 10/836,639, Bi et al., filed Apr. 29, 2004, mailed Sep. 21, 2006.
Frey, Joe, "Putting a price on auto injuries: How software called Colossus evaluates your pain," Insure.com, Oct. 26, 2000, pp. 1-5.
Graff, "Laser Marking Makes Bigger Imprint in Plastics", Aug 11, 2004, 7 pages.
Harts, "Reel to Real: Should You believe What You See?" Defense Counsel Journal, Oct. 1999, vol. 66. p. 514 from the Dialog File ABI/Inform Global.
Hill, "Cure of Thermoset Industrial Coatings", Proc. 2d Pacific Coatings forum, Nov. 1-3, 1997, 6 pages.
Hirabayashi et al., "AC Power Eledroluminescence Maintenance Improvement", pp. 2449, 2452 (1983).
Holding State in Objects with Microsoft Transaction Server, Microsoft Corp., pp. 2, Jun. 1997. (f37).
Hong et al., Integrating Faces and Fingerprints for Personal Identification, IEEE Trans. On Pattern Analysis and Machine Intelligence, vol. 20, No. 12, Dec. 1998, pp. 1295-1307.
Howarth, B., "Outsourcing: Technology on tap", *Information Economy, BRW*, 21(47):1-5 (1998).
Hu et al., "Locating head and face boundaries for head-shoulder images", Patern Recognition, 32(8):1317-1333 (1999).
ldentix, Inc., ImageWare Brings Facial Recognition to the Web, press release, Accessed Oct. 10, 2002, 2 pages.
ImageWare Takes Enterprise ID Management to the World Wide Web, new release, Accessed Oct. 10, 2002, 2 pages.
Indovina, "Multimodal Biometric Authentication Methods," A COTS Approach, 8 pages.
Insurance Connections, Computer Sciences Corporation, Feb./Mar. 1999, 52 pages.
Insurance Connections, Computer Sciences Corporation, Feb./Mar. 2000, 60 pages.
Insurance Connections, Computer Sciences Corporation, Jun./Jul. 1999, 56 pages.
Insurance Connections, Computer Sciences Corporation, Jun./Jul. 2000, 43 pages.
Insurance Connections, Computer Sciences Corporation, Sep./Oct. 2000, 43 pages.
Insurance Connections, Computer Sciences Corporations, Oct./Nov. 1999, 56 pages.
International search report application No. PCT/US01/30822, mailed Jan. 22, 2002, 5 pages.
Jain et al., A Multimodal Biometric System Using fingerprint, Face and Speech, Proc. 2d Int. Conf. on A VBPA, Mar. 1999, pp. 182-187.
Jarvis, "Are Privacy Rights of Citizens Being Eroded Wholesale?" Accessed Oct. 4, 2002, 5 pages.
Juhl, Randy P., "The OTC Revolution"; Drugtopics.com; Mar. 3, 1997, pp. 1-9.
Kahn, "The Premise Behind Premises Liability" Feb. 1994, Security Management, vol. 38, Iss.2 pp. 61-63.
Kanopoulos et al., "Design of an image edge detection filter using the sobel operator", *IEEE J. Solid-State Circuits*, 23(2):358-367 (1988).
Kawaguchi et al., "Principle and Applications of BPCS-Streganography," *Proc. SPIE*, 3258:464-473 (1998).
Komatsu et al., "Authentication System Using Concealed Image in Telematics," *Memoirs of the School of Science & Engineering, Waseda Univ.*, No. 52, 45-60 (1988).
Komatsu, et al., "A Proposal on Digital Watermarking in Document Image Communication and Its Application to Realizing a Signature," *Electronics and Communications in Japan*, 73(5):22-23 (1990).
Laser Technology, Inc. "Crash/Crime Scene Mapping" @ http://www.lasertech.com/accidentcsinv.html. Copyright 1999.
Laser Technology, inc. "QuickMap 3D" http:web.archive.org/web/200003011511/222.lasertech.com/laserproducts/qm3d.html, last viewed on Nov 28, 2005.
Lhotka et al., "Lenticular Inkjet Printmaking", http://www.dvpratt.com/evesmind/lentOver.htm, pp. 1-2 (Dec. 16, 2002).
Li et al., "Facial Expression Transformation Based on Sketch Image and Multiscale Edges", *Electronics Comm. Japan*, 84(9):67-75 (2001).
Lindberg, Gunnar, "Calculating Transport Accident Costs: Final report of the Expert Advisors to the high Level group on Infrastructure charging (Working Group 3)." Borlaenge, Sweden. Apr. 27, 1999, 53 pages.
Liu, "A Practical Guide to Biometric Security Technology," 2001 IEEE, Jan./Feb. 2001 IT PRO, pp. 27-32.
Madan, "The Face is Familier," 2001, 2 pages.
Malloy, "Big Time' Match Frame May Be Small, but it has No Problems Working with the Big Boys", San Antonio Business Journal, vol. 5 No. 11, s1, p. aa, Mar. 15, 1999. Dialog ID No. 0205483 from Dialog File 635 (Business Dateline. RTM.).
McHenry, Brian G., "The Algorithms of Crash," Southeast Coast Collision Conference, Aug. 2001, pp. 1-34.
Mead, "Measuring the value added by technical documentation: A review of research and practice", *Technical Comunication*, 45(3):353-380 (1998).
Meckbach, "U.S. Universities pick up Ditek's CAD application" Feb. 26, 1999. Computing Canada. vol. 25, Iss. 8 p. 14.
Merlin, Jr., William F., "Collision Course With The Colossus Program: How to Deal With It," The Merlin Law Group, May 2000, Tampa, FL, pp. 1-17.
Merlin, Jr., William F., "Colossus: What We Know Today," The Merlin Law Group, Aug. 2000, Tampa, FL, pp. 1-8.
Merlin, Jr., William F., "Overcoming Allstate's TradeSecrets and Work-Product Objections," The Merlin Law Group, Mar. 2000, Tampa, FL, pp. 1-31.
Mhatre, "Efficient Search and Retrieval in Biometric Databases," 4 pages.
Microsoft Component Services: Server Operating System A Technology Overview, Microsoft Corp., pp. 1-7, Aug. 15, 1998. (f38).
Moran, R., "3-D Imagery", http://www.flexography.org/flexo/article.cfm?ID=45, pp. 1-3 (Dec. 16, 2002).
Nandakumar, "Score Normalization in Multimodal Biometric Systems," 2 pages.
Narin, Geoff, IT and Crime Resolution, It's elementary, Holmes helps UK police solve crimes, Financial Times, Dec. 3, 1997, Financial Times (London, UK), p. 17.
Nicolle, "Elementary, dear Holmes," Jan. 22, 1997, The Times (London, UK, p. Interfa).
Non-Final Rejection, U.S. Appl. No. 10/836,639, Bi et al., filed Apr. 29, 2004, mailed Apr. 14, 2009.
Non-Final Rejection, U.S. Appl. No. 10/836,639, Bi et al., filed Apr. 29, 2004, mailed Aug. 8, 2007.
Non-Final Rejection, U.S. Appl. No. 10/836,639, Bi et al., filed Apr. 29, 2004, mailed Mar. 10, 2006.
Non-Final Rejection, U.S. Appl. No. 10/836,639, Bi et al., filed Apr. 29, 2004, mailed Aug. 10, 2005.
Oct. 18, 2007 Communication from the European Patent Office in Application No. EP 02 805 980.6.
Office Action dated Feb. 1, 2007, from U.S. Appl. No. 10/942,321, 10 pages.
Office Action dated May 13, 2008, from U.S. Appl. No. 10/677,092, 5 pages.
Office Action dated Jun. 20, 2007, from U.S. Appl. No. 10/677,092, 6 pages.
Palla, "Classification and Indexing in Large Biometric Databases," 2 Pages.
Paulson, B.A., "High Definition Printing Process for Identification Card Production", ICMA, www.icma.com/info/hdprinting91099.htm, (Apr. 9, 2002).
PCT - International Search Report for International Application No. PCT/USO2/41644, mailed on May 30, 2003.
PCT - International Search Report for International Application No. PCT/USO2/41680, mailed on Jun. 5, 2003.
PCT - International Search Report for International Application No. PCT/USO2/41681, mailed on Jun. 5, 2003.
PCT - International Search Report for International Application No. PCT/US02/40843, mailed on May 15, 2003.
PCT - International Search Report for International Application No. PCT/US03/15095, mailed on Mar. 25, 2004.
PCT - International Search Report for International Application No. PCT/US02/41320, mailed on Jul. 28, 2003.
PCT - Notification of Transmittal of the International Search Report for the Declaration, for International Application No. PCT/USO2/40843, mailed on May 15, 2003.
PCT - Notification of Transmittal of the International Search Report for the Declaration, for International Application No. PCT/USO2/41680, mailed on Jun. 5, 2003.
PCT - Notification of Transmittal of the International Search Report for the Declaration, for International Application No. PCT/US02/41320, mailed on Jul. 28, 2003.
Perry et al., "Digital Watermarks as a Security Feature for Identity Documents", *Proc. Of SPIE*, 3973:80-87 (2000).
Plastics Technology, "Laser Marking Has a Bright Future in Plastics", http://www.plasticstechnology.com/articles/200108fa1.html, Aug. 2001, 5 pages.
Printed copy of a PolyOne company web page for FAST MARK colorants, 2 printed pages, printed on Dec. 15, 2003 and accessed from: http://www.polyone.com/bizuunit/bizunit_info.asp?ID1={4D07B4ED-C098-43E4-B802-21413A1FA74C}&ID2={8C29FDCA-7C9E-433E-897A-DB6354A01CAA}&ID3={00000000-0000-0000-0000-000000000000}&ID4={FE3434DA-7FA0-4FFF-99AF-CDD99EC16AE1}&bizUnit=NA-P-CM&line=&sub=none.
Property and Casualty Solutions: CSC's Property & Casualty Claims Solutions, Computer Sciences Corporation, pp. 2, 2003. (g51).
Ross, "Information Fusion in Biometrics," Proc. Of 3rd Intl Conf. on Audio-and Video-Based Person Authentication, pp. 354-359, Jun. 6-8, 2001.
Ross, "Multimodal Biometrics: An Overview." 12 European Signal Processing Conf., pp. 1221-1224, Sep. 2004.
Santroprene, "Add Value to Your TPEs with Special Effects", 12 pages.
Scopus and Entrust: Call Center Sales Helper is Unveiled, Nov. 10, 1997; vol. 162, Issue 217, p. 19.
Scopus Introduces World'Most Complete Call Center Solution for Financial Services; PR Newswire dated Nov. 5, 1997.
Seybold Report on desktop Publishing, "Holographic Signatures for Digital Images", Aug. 1995, 1 page.
Spice, "Police use lasers, computers to map scenes Town of Pewaukee's new system boost accuracy of reconstructions, users say" Sep. 29, 1998. Milwaukee Journal Sentinel. p. 2.
Straight Through Processing: Migration Assessment for Series II Clients Computer Sciences Corporation, p. 6, 2003. (g50).
Supplemental European Search Report dated Jul. 20, 2006, from EP Application No. 02805980 (Corresponding to PCT/US02/41681; Published as WO03/056507).
Szepanski, "A Signal Theoretic Method For Creating Forgery-Proof Documents For Automatic Verification", 1979 Carnahan Conference on Crime Countermeasures, University of Kentucky, Lexington, Kentucky, May 16-18, 1979, pp. 101-109. .
Trademark for @Fault, accessed from uspto.gov on Feb. 8, 2006.
Traynor, "The Effects of Varying Safety Conditions on the External Costs of Driving," Winter, 1994 Eastern Economic Journal, vol. 20 No. 1 pp. 45-60.
U.S. Patent and Trademark Office, "Communication" for U.S. Appl. No. 09/969,027 mailed Jan. 11, 2008, availabe in PAIR.
U.S. Patent and Trademark Office, "Communication" for U.S. Appl. No. 09/969,017 mailed May 9, 2007, availabe in PAIR.
U.S. Patent and Trademark Office, "Communication" for U.S. Appl. No. 09/969,016 mailed May 3, 2007, availabe in PAIR.
U.S. Patent and Trademark Office, "Communication" for U.S. Appl. No. 09/969,534 mailed May 30, 2007, availabe in PAIR.
U.S. Patent and Trademark Office, "Communication" for U.S. Appl. No. 09/969,027 mailed Jun. 20, 2007, availabe in PAIR.
U.S. Patent and Trademark Office, "Communication" for U.S. Appl. No. 10/306,866 mailed Jun. 21, 2007, availabe in PAIR.
U.S. Patent and Trademark Office, "Communication" for U.S. Appl. No. 10/306,858 mailed Jun. 29, 2007, availabe in PAIR.
U.S. Patent and Trademark Office, "Communication" for U.S. Appl. No. 09/969,021 mailed Mar. 8, 2007, availabe in PAIR.
U.S. Patent and Trademark Office, "Communication" for U.S. Appl. No. 09/969,020 mailed Jul. 5, 2007, availabe in PAIR.
U.S. Patent and Trademark Office, "Communication" for U.S. Appl. No. 09/969,018 mailed Jun. 21, 2007, availabe in PAIR.
U.S. Patent and Trademark Office, "Communication" for U.S. Appl. No. 09/969,024 mailed May 23, 2007, availabe in PAIR.
U.S. Patent and Trademark Office, "Communication" for U.S. Appl. No. 10/306,623 mailed Mar. 7, 2007, availabe in PAIR.
U.S. Patent and Trademark Office, "Communication" for U.S. Appl. No. 10/306,873 mailed Sep. 20, 2007, availabe in PAIR.
U.S. Patent and Trademark Office, "Communication" for U.S. Appl. No. 10/306,804 mailed Oct. 3, 2007, availabe in PAIR.

U.S. Patent and Trademark Office, "Communication" for U.S. Appl. No. 10/306,909 mailed Oct. 5, 2007, availabe in PAIR.
U.S. Patent and Trademark Office, "Communication" for U.S. Appl. No. 10/306,803 mailed Oct. 5, 2007, availabe in PAIR.
U.S. Patent and Trademark Office, "Communication" for U.S. Appl. No. 10/306,908 mailed Oct. 4, 2007, availabe in PAIR.
U.S. Patent and Trademark Office, "Communication" for U.S. Appl. No. 10/306,864 mailed Oct. 4, 2007, available in PAIR.
U.S. Patent and Trademark Office, "Communication" for U.S. Appl. No. 09/969,545 mailed Oct. 18, 2006, available in PAIR.
U.S. Patent and Trademark Office, "Communication" for U.S. Appl. No. 10/306,628 mailed Oct. 10, 2007, available in PAIR.
U.S. Patent and Trademark Office, "Communication" for U.S. Appl. No. 09/969,024 mailed Jan. 31, 2006, available in PAIR.
U.S. Patent and Trademark Office, "Communication" for U.S. Appl. No. 09/969,024 mailed Jun. 1, 2006, available in PAIR.
U.S. Patent and Trademark Office, "Communication" for U.S. Appl. No. 09/969,022 mailed Apr. 6, 2006, available in PAIR.
U.S. Patent and Trademark Office, "Communication" for U.S. Appl. No. 09/969,015 mailed Jun. 1, 2006, available in PAIR.
U.S. Patent and Trademark Office, "Communication" for U.S. Appl. No. 09/969,019 mailed Jun. 1, 2006, available in PAIR.
U.S. Patent and Trademark Office, "Communication" for U.S. Appl. No. 09/969,546 mailed Mar. 21, 2006, available in PAIR.
U.S. Patent and Trademark Office, "Communication" for U.S. Appl. No. 09/969,016 mailed Mar. 21, 2006, available in PAIR.
U.S. Patent and Trademark Office, "Communication" for U.S. Appl. No. 09/969,018 mailed Jan. 26, 2006, available in PAIR.
U.S. Patent and Trademark Office, "Communication" for U.S. Appl. No. 09/969,018 mailed Jun. 2, 2006, available in PAIR.
U.S. Patent and Trademark Office, "Communication" for U.S. Appl. No. 09/969,545 mailed Mar. 23, 2006, available in PAIR.
U.S. Patent and Trademark Office, "Communication" for U.S. Appl. No. 09/969,536 mailed Mar. 24, 2006, available in PAIR.
U.S. Patent and Trademark Office, "Communication" for U.S. Appl. No. 09/969,516 mailed Aug. 10, 2006, available in PAIR.
U.S. Patent and Trademark Office, "Communication" for U.S. Appl. No. 09/970,161 mailed Mar. 23, 2006, available in PAIR.
U.S. Patent and Trademark Office, "Communication" for U.S. Appl. No. 09/969,021 mailed Feb. 27, 2006, available in PAIR.
U.S. Patent and Trademark Office, "Communication" for U.S. Appl. No. 09/969,146 mailed Feb. 28, 2006, available in PAIR.
U.S. Patent and Trademark Office, "Communication" for U.S. Appl. No. 09/969,027 mailed Mar. 3, 2006, available in PAIR.
U.S. Patent and Trademark Office, "Communication" for U.S. Appl. No. 09/969,018 mailed Dec. 4, 2006, available in PAIR.
U.S. Patent and Trademark Office, "Communication" for U.S. Appl. No. 10/306,858 mailed Dec. 13, 2007.
U.S. Patent and Trademark Office, "Communication" for U.S. Appl. No. 10/238,981 mailed Jan. 25, 2008.
U.S. Patent and Trademark Office, "Communication" for U.S. Appl. No. 10/238,029 mailed Dec. 13, 2007.
U.S. Patent and Trademark Office, "Communication" for U.S. Appl. No. 09/969,021 mailed Jan. 8, 2008.
U.S. Patent and Trademark Office, "Communication" for U.S. Appl. No. 10/238,981 mailed Apr. 16, 2008.
U.S. Patent and Trademark Office, "Communication"for U.S. Appl. No. 10/238,019 mailed Jan. 11, 2008.
U.S. Patent and Trademark Office, "Communication"for U.S. Appl. No. 10/306,623 mailed Jan. 25, 2008.
U.S. Patent and Trademark Office, "Communication"for U.S. Appl. No. 09/969,017 mailed Apr. 16, 2008.
U.S. Patent and Trademark Office, "Communication"for U.S. Appl. No. 09/969,016 mailed Mar. 17, 2008.
U.S. Patent and Trademark Office, "Communication"for U.S. Appl. No. 09/969,534 mailed Apr. 15, 2008.
U.S. Patent and Trademark Office, "Communication"for U.S. Appl. No. 09/969,019 mailed Feb. 27, 2008.
U.S. Patent and Trademark Office, "Communication"for U.S. Appl. No. 09/969,019 mailed Apr. 28, 2008.
U.S. Patent and Trademark Office, "Communication"for U.S. Appl. No. 09/969,146 mailed Sep. 22, 2006.
U.S. Patent and Trademark Office, "Communication"for U.S. Appl. No. 09/969,146 mailed Oct. 5, 2007.
U.S. Patent and Trademark Office, "Communication"for U.S. Appl. No. 10/306,628 mailed Mar. 27, 2008.
U.S. Patent and Trademark Office, "Communication"for U.S. Appl. No. 10/238,029 mailed May 12, 2008.
U.S. Patent and Trademark Office, "Communication"for U.S. Appl. No. 10/306,864 mailed Mar. 27, 2008.
U.S. Patent and Trademark Office, "Communication"for U.S. Appl. No. 10/306,908 mailed Mar. 21, 2008.
U.S. Patent and Trademark Office, "Communication"for U.S. Appl. No. 10/306,866 mailed May 5, 2008.
U.S. Patent and Trademark Office, "Communication"for U.S. Appl. No. 09/969,534 mailed Feb. 17, 2006, available in PAIR.
U.S. Patent and Trademark Office, "Communication"for U.S. Appl. No. 09/969,017 mailed Mar. 1, 2006, available in PAIR.
U.S. Patent and Trademark Office, "Communication"for U.S. Appl. No. 09/969,017 mailed Oct. 11, 2006, available in PAIR.
U.S. Patent and Trademark Office, "Communication"for U.S. Appl. No. 09/969,017 mailed May 9, 2007, available in PAIR.
U.S. Patent and Trademark Office, "Communication"for U.S. Appl. No. 09/969,534 mailed May 30, 2007, available in PAIR.
U.S. Patent and Trademark Office, "Communication"for U.S. Appl. No. 09/969,516 mailed Nov. 14, 2007, available in PAIR.
U.S. Appl. No. 10/836,639, Bi et al., filed Apr. 29, 2004.
U.S. Appl. No. 09/741,779, filed Dec. 21, 2000.
U.S. Appl. No. 60/456,677, filed Mar. 21, 2003.
U.S. Appl. No. 60/459,284, filed Mar. 31, 2003.
U.S. Appl. No. 60/463,659, filed Apr. 16, 2003.
U.S. Appl. No. 60/463,660, filed Mar. 31, 2003.
U.S. Appl. No. 60/488,536, filed Jul. 17, 2003.
U.S. Appl. No. 60/494,660, filed Aug. 8, 2003.
Unisys Selects Identix for Department of Defense Research on Three Dimensional Facial Recognition, Press Release, Jul. 29, 2003, 3 pages.
Utzaeider, James, "Microsoft Transaction Server and Internet Information Server: Technology for the Web," Microsft Corp., p. 15, Feb. 6, 1998. (f44).
W. Rankl and W. Effing, "Smart Card Hand Book" 1997, John Wiley & Sons, pp. 35-40.
Warland et al., High-Performance Communication Networks, *Economics*, Chapter 8 through 8.2.1:361-369 (1996).
Watt & Policarpo, "The Computer Image", Addison Wesley, pp. 247-249 (1998).
Wayne Electronics, Inc., What is FaceIt? Accessed Oct. 10, 2002, 5 pages.
Willems, "Biometrics: Detecting the 'Goats'," Speech Technology Magazine, Oct. 9, 2003, 6 pages.
WO02/052499 search report, dated Aug. 30, 2002.
WO02/052499 Written Opinion, dated Mar. 18, 2004.

* cited by examiner

PRIOR ART (A)

LASER ETCHED SECURITY FEATURES FOR IDENTIFICATION DOCUMENTS AND METHODS OF MAKING SAME

RELATED APPLICATION DATA

This application is a continuation of application Ser. No. 10/330,033, filed Dec. 24, 2002, which claims priority to provisional patent application 60/344,716, filed Dec. 24, 2001.

The subject matter of this application is also related to the following U.S. provisional patent applications, which were filed Dec. 24, 2001:

- Sensitizing Materials For Laser Engraving (Application No. 60/344,677);
- Full Color Laser Engraved System For Identification Card Imaging (Application No. 60/344,674);
- Reducing Cracking In Identification Documents (Application No. 60/344,710);
- An Inkjet Receiver on Teslin Sheet (Application No. 60/344,685);
- Laser Engraving Coating System (Application No. 60/344,675);
- Forming Variable Information In Identification Documents by Laser Ablation (Application No. 60/344,676);
- Manufacture of Contact Smart Cards (Application No. 60/344,717);
- Manufacture of Contact-Less Smart Cards (Application No. 60/344,719);
- Manufacture of An All-Pet Identification Document (Application No. 60/344,673);
- Tamper Evident Coating To Combat Heat Intrusion (Application No. 60/344,709);
- Pressure Sensitive UV Curable Adhesive Composition (Application No. 60/344,753);
- Heat Activated UV Curable Adhesive Composition (Application No. 60/344,688);
- Security Ink With Cohesive Failure (Application No. 60/344,698);
- Variable Based Identification Documents With Security Features (Application No. 60/344,686);
- Multiple Image Feature For Identification Document (Application No. 60/344,718);
- Biometric Identification System (Application No. 60/344,682);
- Identification Document Using Polasecure In Differing Colors (Application No. 60/344,687); and
- Secure ID Card With Multiple Images and Method of Making (Application No. 60/344,683).

The subject matter of this application is also related to the following applications:

- Identification Document and Related Methods (Application No. 60/421,254, filed Oct. 25, 2002);
- Identification Document and Related Methods (Application No. 60/418,762, filed Oct. 15, 2002);
- Image Processing Techniques for Printing Identification Cards and Documents (Application No. 60/371,335, filed Apr. 9, 2002);
- Shadow Reduction System and Related Techniques for Digital Image Capture (Application No. 60/410,544, filed Sep. 13, 2002);
- Systems and Methods for Recognition of Individuals Using Combination of Biometric Techniques (Application No. 60/418,129, filed Oct. 11, 2002);

- Methods of Providing Optical Variable Device for Identification Documents (Application No. 60/429,115, filed Nov. 25, 2002);
- Systems and Methods for Managing and Detecting Fraud in Image Databases Used with Identification Documents (Application No. 60/429,501, filed Nov. 26, 2002);
- Identification Card Printed with Jet Inks and Systems and Methods of Making Same (application Ser. No. 10/289,962, filed Nov. 6, 2002, published as US20030211296);

The present technology is also related to U.S. patent application Ser. No. 09/747,735, filed Dec. 22, 2000 (now U.S. Pat. No. 6,923,378); Ser. No. 09/602,313, filed Jun. 23, 2000 (now U.S. Pat. No. 6,752,432); Ser. No. 10/094,593, filed Mar. 6, 2002, Provisional Patent Application No. 60/358,321, filed Feb. 19, 2002, as well as U.S. Pat. No. 6,066,594.

Each of the above-referenced documents is herein incorporated by reference.

TECHNICAL FIELD

The present technology is generally related to identification documents, and in one particular arrangement concerns laser engraving security features onto such identification documents.

BACKGROUND

Exemplary prior work illustrating laser engraving/etching of identification documents is shown in UK patent publications GB 2,240,948 and GB 2,132,136, and in PCT publication WO00/43216. The reader is referred to such documents for background.

Identification documents (hereafter "ID documents") play a critical role in today's society. One example of an ID document is an identification card ("ID card"). ID documents are used on a daily basis—to prove identity, to verify age, to access a secure area, to evidence driving privileges, to cash a check, and so on. Airplane passengers are required to show an ID document during check in, security screening, and prior to boarding their flight. In addition, because we live in an ever-evolving cashless society, ID documents are used to make payments, access an automated teller machine (ATM), debit an account, or make a payment, etc.

Many types of identification cards and documents, such as driving licenses, national or government identification cards, bank cards, credit cards, controlled access cards and smart cards, carry thereon certain items of information which relate to the identity of the bearer. Examples of such information include name, address, birth date, signature and photographic image; the cards or documents may in addition carry other variant data (i.e., data specific to a particular card or document, for example an employee number) and invariant data (i.e., data common to a large number of cards, for example the name of an employer). All of the cards described above will hereinafter be generically referred to as "ID documents".

FIGS. 1 and 2 illustrate a front view and cross-sectional view (taken along the A-A line), respectively, of an exemplary prior art identification (ID) document 10. In FIG. 1, the prior art ID document 1 includes a photographic image 12, a bar code 14 (which may contain information specific to the person whose image appears in photographic image 12 and/or information that is the same from ID document to ID document), variable personal information 16, such as an address, signature, and/or birthdate, and biometric information 18 associated with the person whose image appears in photographic image 12 (e.g., a fingerprint). Although not illustrated in FIG. 1, the ID document 10 can include a magnetic stripe (which, for example, can be on the rear side (not shown) of the ID document 10), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

Referring to FIG. 2, an ID document 10 comprises a pre-printed core 20 (also referred to as a substrate). In many applications, the core can be a light-colored, opaque material, such as, for example, white polyvinyl chloride (PVC) material that is, for example, about 25 mil thick. The core 20 is laminated with a transparent material, such as clear PVC material 22, which, by way of example, can be about 1-5 mil thick. The composite of the core 20 and clear PVC material 22 form a so-called "card blank" 25 that can be up to about 30 mils thick. Information 26*a-c* is printed on the card blank 25 using a method such as Dye Diffusion Thermal Transfer ("D2T2") printing (described further below and also in commonly assigned U.S. Pat. No. 6,066,594, which is incorporated herein by reference.) The information 26*a-c* can, for example, comprise an indicium or indicia, such as the invariant or nonvarying information common to a large number of identification documents, for example the name and logo of the organization issuing the documents. The information 26*a-c* may be formed by any known process capable of forming the indicium on the specific core material used.

To protect the information 26*a-c* that is printed, an additional layer of overlaminate 24 can be coupled to the card blank 25 and printing 26*a-c* using, for example, 1 mil of adhesive (not shown). The overlaminate 24 can be substantially transparent. Materials suitable for forming such protective layers are known to those skilled in the art of making identification documents and any of the conventional materials may be used provided they have sufficient transparency. Examples of usable materials for overlaminates include biaxially oriented polyester or other optically clear durable plastic film.

The above-described printing techniques are not the only methods for printing information on data carriers such as ID documents. Laser beams, for example can be used for marking, writing, bar coding, etching, and engraving many different types of materials, including plastics. Lasers have been used, for example, to mark plastic materials to create indicia such as bar codes, date codes, part numbers, batch codes, and company logos. Lasers also have been used to engrave or etch very fine patterns into articles that are extremely difficult to replicates.

It will be appreciated that laser engraving or marking generally involves a process of inscribing or engraving a document surface with identification marks, characters, text, tactile marks—including text, patterns, designs (such as decorative or security features), photographs, etc. Some types of thermoplastics, such as polyvinylchloride (PVC), acrylonitrile butadiene styrene (ABS), and polyethylene terephthalate (PET), are capable of absorbing laser energy in their native states. Some materials which are transparent to laser energy in their native state, such as polyethylene, may require the addition of one or more additives to be responsive to laser energy.

For additional background, various laser marking and/or engraving techniques are disclosed, e.g., in U.S. Pat. Nos. 6,022,905, 5,298,922, 5,294,774, 5,215,864 and 4,732,410. In addition, U.S. Pat. Nos. 4,816,372, 4,894,110, 5,005,872, 5,977,514, and 6,179,338 describe various implementations for using a laser to print information. All of these patents are incorporated herein in their entirety.

Features and advantages of the present technology are disclosed in the following Detailed Description, which proceeds with reference to the accompanying drawings.

Figure 1:
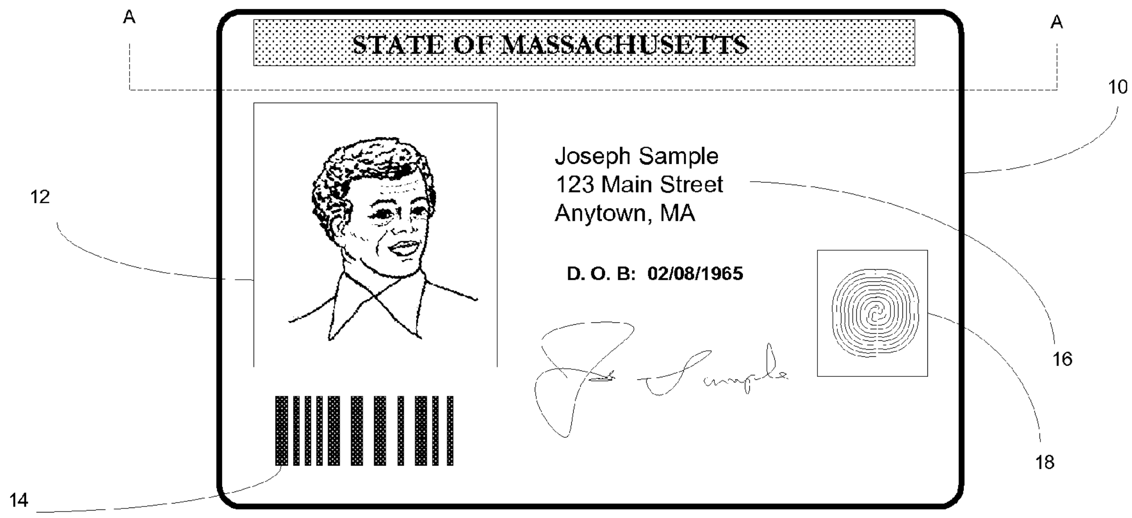
FIGURE 1 PRIOR ART
FIG. 1 is an illustrative example of a prior art identification document.
Figure 2:
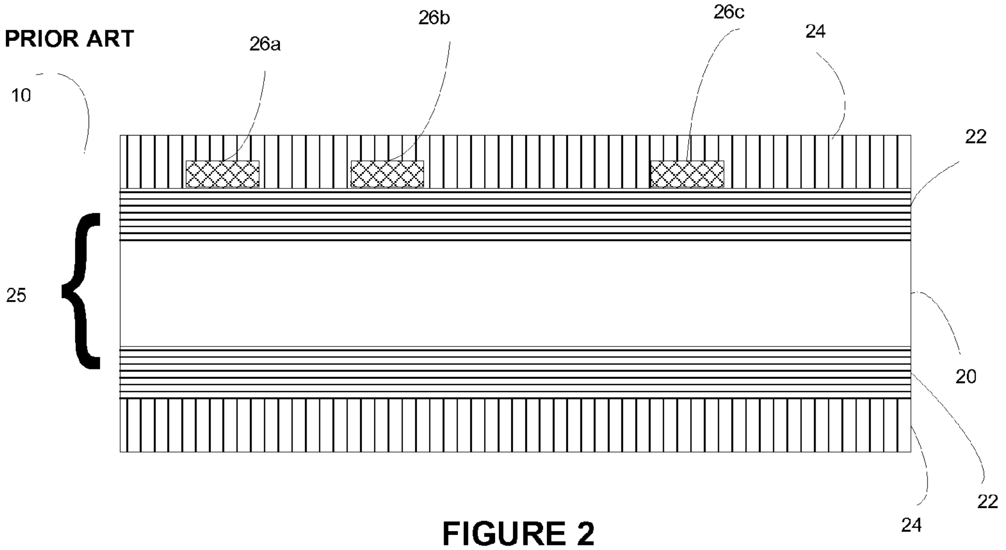
FIG. 2 is an illustrative cross section of the prior art identification document of FIG. 1, taken along the A-A line.

The drawings are not necessarily to scale, emphasis instead generally being placed upon illustrating the principles of the technology. In addition, in the figures, like numbers refer to like elements. Further, throughout this application, laser engraved indicia, information, identification documents, data, etc., may be shown as having a particular cross sectional shape (e.g., rectangular) but that is provided by way of example and illustration only and is not limiting, nor is the shape intended necessarily to represent the actual resultant cross sectional shape that occurs during laser engraving or manufacturing of identification documents.

DETAILED DESCRIPTION

A. Introduction

In the foregoing discussion, the use of the word "ID document" is broadly defined and intended to include at least all types of ID documents, including (but are not limited to), documents, magnetic disks, credit cards, bank cards, phone cards, stored value cards, prepaid cards, smart cards (e.g., cards that include one more semiconductor chips, such as memory devices, microprocessors, and microcontrollers), contact cards, contactless cards, proximity cards (e.g., radio frequency (RFID) cards), passports, driver's licenses, network access cards, employee badges, debit cards, security cards, visas, immigration documentation, national ID cards, citizenship cards, social security cards and badges, certificates, identification cards or documents, voter registration and/or identification cards, police ID cards, border crossing cards, security clearance badges and cards, gun permits, badges, gift certificates or cards, membership cards or badges, tags, CD's, consumer products, knobs, keyboards, electronic components, etc., or any other suitable items or articles that may record information, images, and/or other data, which may be associated with a function and/or an object or other entity to be identified.

Note that, for the purposes of this disclosure, the terms "document," "card," "badge" and "documentation" are used interchangeably.

In addition, in the foregoing discussion, "identification" includes (but is not limited to) information, decoration, and any other purpose for which an indicia can be placed upon an article in the article's raw, partially prepared, or final state. Also, instead of ID documents, the present techniques can be employed with product tags, product packaging, business cards, bags, charts, maps, labels, etc., etc., particularly those items including engraving of an laminate or over-laminate structure. The term ID document thus is broadly defined herein to include these tags, labels, packaging, cards, etc.

"Personalization", "Personalized data" and "variable" data are used interchangeably herein, and refer at least to data, images, and information that are printed at the time of card personalization. Personalized data can, for example, be "personal to" or "specific to" a specific cardholder or group of cardholders. Personalized data can include data that is unique to a specific cardholder (such as biometric information, image information), but is not limited to unique data. Personalized data can include some data, such as birthdate, height, weight, eye color, address, etc., that are personal to a specific cardholder but not necessarily unique to that cardholder (i.e., other cardholders might share the same personal data, such as birthdate). Depending on the application, however, personalized data can also include some types of data that are not different from card to card, but that are still provided at the time of card personalization. For example, a state seal that is laser engraved onto a portion of an overlaminate in an identification document, where the laser engraving occurs during the personalization of the card, could in some instances be considered to be "personalized" information.

The terms "laser engraving" and "laser etching" are used interchangeably herein.

The terms "indicium" and indicia as used herein cover not only markings suitable for human reading, but also markings intended for machine reading. Especially when intended for machine reading, such an indicium need not be visible to the human eye, but may be in the form of a marking visible only under infra-red, ultra-violet or other non-visible radiation. Thus, in at least some embodiments, an indicium formed on any layer in an identification document (e.g., the core layer) may be partially or wholly in the form of a marking visible only under non-visible radiation. Markings comprising, for example, a visible "dummy" image superposed over a non-visible "real" image intended to be machine read may also be used.

"Laminate" and "overlaminate" include (but are not limited to) film and sheet products. Laminates usable with at least some embodiments include those which contain substantially transparent polymers and/or substantially transparent adhesives, or which have substantially transparent polymers and/or substantially transparent adhesives as a part of their structure, e.g., as an extruded feature. Examples of usable laminates include at least polyester, polycarbonate, polystyrene, cellulose ester, polyolefin, polysulfone, or polyamide. Laminates can be made using either an amorphous or biaxially oriented polymer as well. The laminate can comprise a plurality of separate laminate layers, for example a boundary layer and/or a film layer.

The degree of transparency of the laminate can, for example, be dictated by the information contained within the identification document, the particular colors and/or security features used, etc. The thickness of the laminate layers is not critical, although in some embodiments it may be preferred that the thickness of a laminate layer be about 1-20 mils. Lamination of any laminate layer(s) to any other layer of material (e.g., a core layer) can be accomplished using any conventional lamination process, and such processes are well-known to those skilled in the production of articles such as identification documents. Of course, the types and structures of the laminates described herein are provided only by way of example, those skilled in the art will appreciated that many different types of laminates are usable.

For example, in ID documents, a laminate can provide a protective covering for the printed substrates and provides a level of protection against unauthorized tampering (e.g., a laminate would have to be removed to alter the printed information and then subsequently replaced after the alteration.). Various lamination processes are disclosed in assignee's U.S. Pat. Nos. 5,783,024, 6,007,660, 6,066,594, and 6,159,327. Other lamination processes are disclosed, e.g., in U.S. Pat. Nos. 6,283,188 and 6,003,581. Each of these U.S. patents is herein incorporated by reference.

The material(s) from which a laminate is made may be transparent, but need not be. Laminates can include synthetic resin-impregnated or coated base materials composed of successive layers of material, bonded together via heat, pressure, and/or adhesive. Laminates also includes security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxy.

For purposes of illustration, the following description will proceed with reference to ID document structures (e.g., TESLIN-core, multi-layered ID documents) and fused polycarbonate structures. It should be appreciated, however, that the present technology is not so limited. Indeed, as those skilled in the art will appreciate, the techniques detailed herein can be applied to many other structures formed in many different ways to improve their laser engraving characteristics. Generally, the technology has applicability for virtually any product which is to be laser etched or laser engraved, especially articles to which a laminate and/or coating is applied, including articles formed from paper, wood, cardboard, paperboard, glass, metal, plastic, fabric, ceramic, rubber, along with many man-made materials, such as microporous materials, single phase materials, two phase materials, coated paper, synthetic paper (e.g., TYVEC, manufactured by Dupont Corp of Wilmington, Del.), foamed polypropylene film (including calcium carbonate foamed polypropylene film), plastic, polyolefin, polyester, polyethylenetelphthalate (PET), PET-G, PET-F, and polyvinyl chloride (PVC), and combinations thereof.

In addition, at least one embodiment relates to virtually any article formed from, laminated with, or at least partially covered by a material that not sufficiently responsive to laser radiation to form a desired indicium (e.g., a grayscale image) thereon, but which is rendered more responsive to laser radiation, at least to a sufficient degree to enable its surface to be marked as desired with a laser beam, by adding the laser enhancing additive to the material itself or to another material (e.g., a coating or laminate) that is substantially adjacent to the material.

B. Laser Etching and Engraving

It is often desirable to mark a portion of a structure, such as a multi-layered structure (including after lamination), such as an ID document, with text, information, graphics, logos, security indicia, security features, marks, images and/or photographs. One goal of producing a secure ID document or card is to be able to manufacture it with materials and/or processes that are not readily available and to endow the card with unique, personalized features that are not easily reproduced by conventional means.

In at least some embodiments, laser etching helps to provide unique personalized features, in that the finished ID document can be uniquely altered and personalized at the same time. In at least one embodiment, the effect produced by laser etching can be identified easily by a person checking the card, often without special equipment, because the laser etching produces a visual effect and/or a tactile effect. In at least one embodiment, laser etching can produce a security feature having an optically variable (OV) quality. Laser etching can be produced so that it cannot be easily seen when viewed straight on; a property that has the added benefit of not allowing it to be photocopied. The laser etched feature, however, becomes very apparent in reflected light because the laser etching creates reflecting surfaces that are not parallel to the surface of the document (e.g., the core surface and/or laminate surface). In addition, the laser removes material from the surface of the card and may (optionally) create a pattern that can be felt by touch. This tactile property may be used to further verify the authenticity of the card.

Figure 3:
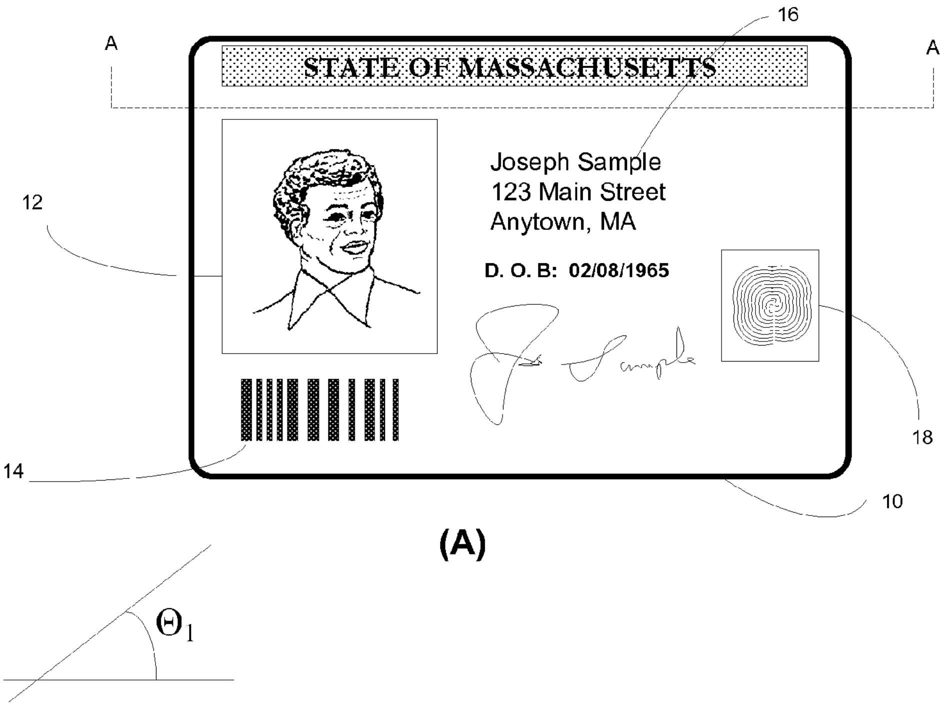
FIGS. 3A and 3B are views of an identification document in accordance with one embodiment, viewed at first and second angles, respectively.
Figure 3:
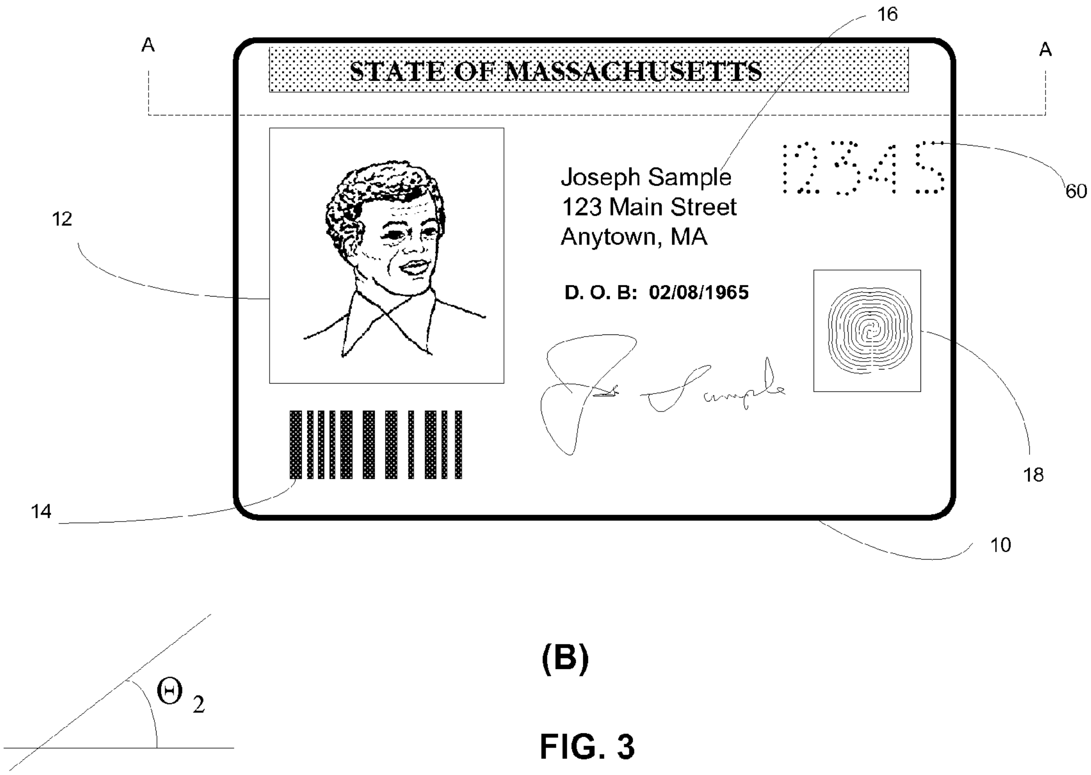

For example, FIGS. 3A and 3B are views of an identification document 10 in accordance with one embodiment, viewed at first and second angles, respectively. FIG. 3A is a view of the identification document 10 where a viewer is looking directly at the identification document 10, and FIG. 3B is view of the identification document 10 as the document is rotated to an angle of about 45 to 85 degrees as compared to the view of the image in FIG. 3A. Of course, the angle depends on the angle of the light, as well, as will be understood by those skilled in the art.

Figure 4:
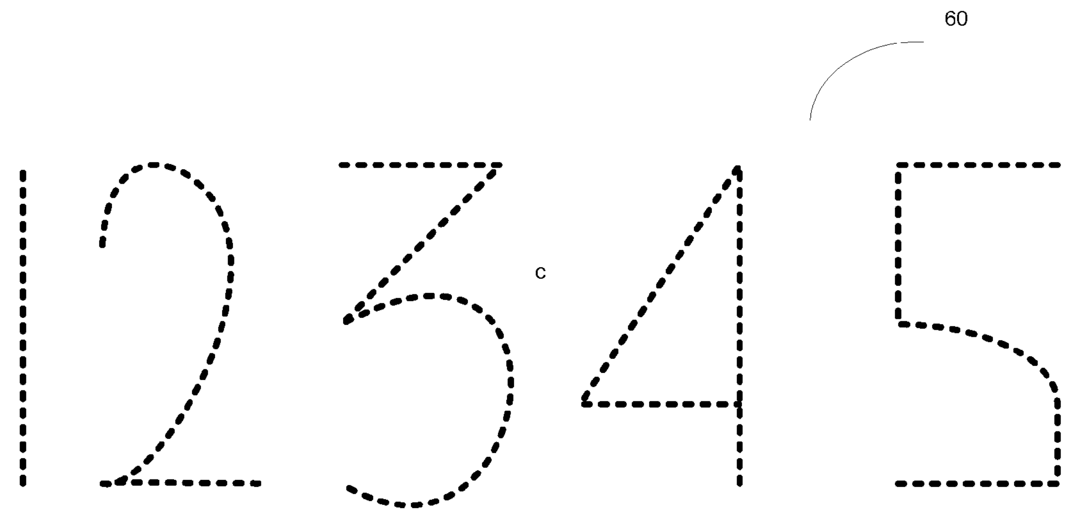
FIG. 4 is an enlarged view of the a security feature of FIG. 3B in accordance with a second embodiment.

To make the laser etched security feature 70, the ID document 10 (which can be a "finished" document, e.g., all laminates, processes, etc. already applied to the document) is subjected to an ablative laser, such as a solid state $C0_2$ laser, that etches a pattern (e.g., security feature) onto its surface. Of course, other lasers may be suitable employed for such etching. FIG. 4 illustrates the security feature 60 that was laser etched into the surface of identification document 10.

Figure 5:
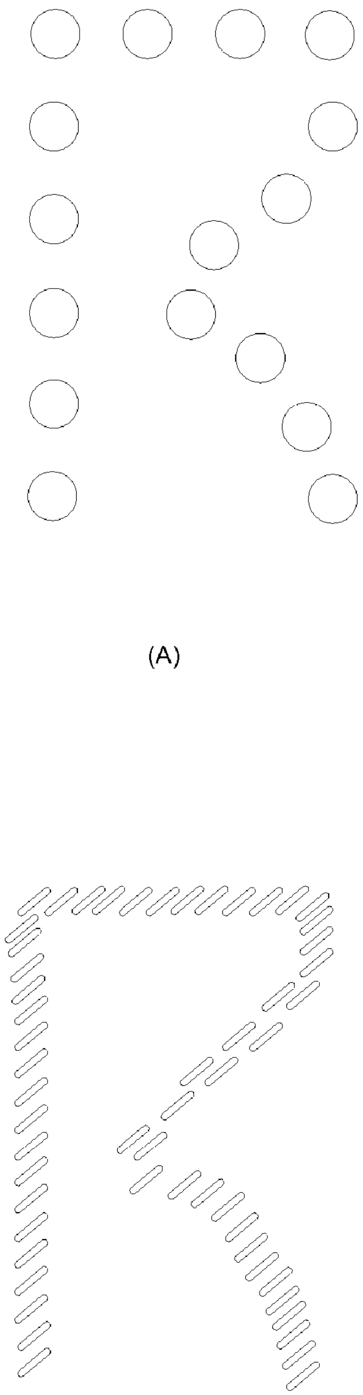
FIGS. 5A and 5B are enlarged views of two illustrative examples of laser etching, in accordance with one embodiment.
Figure 6:
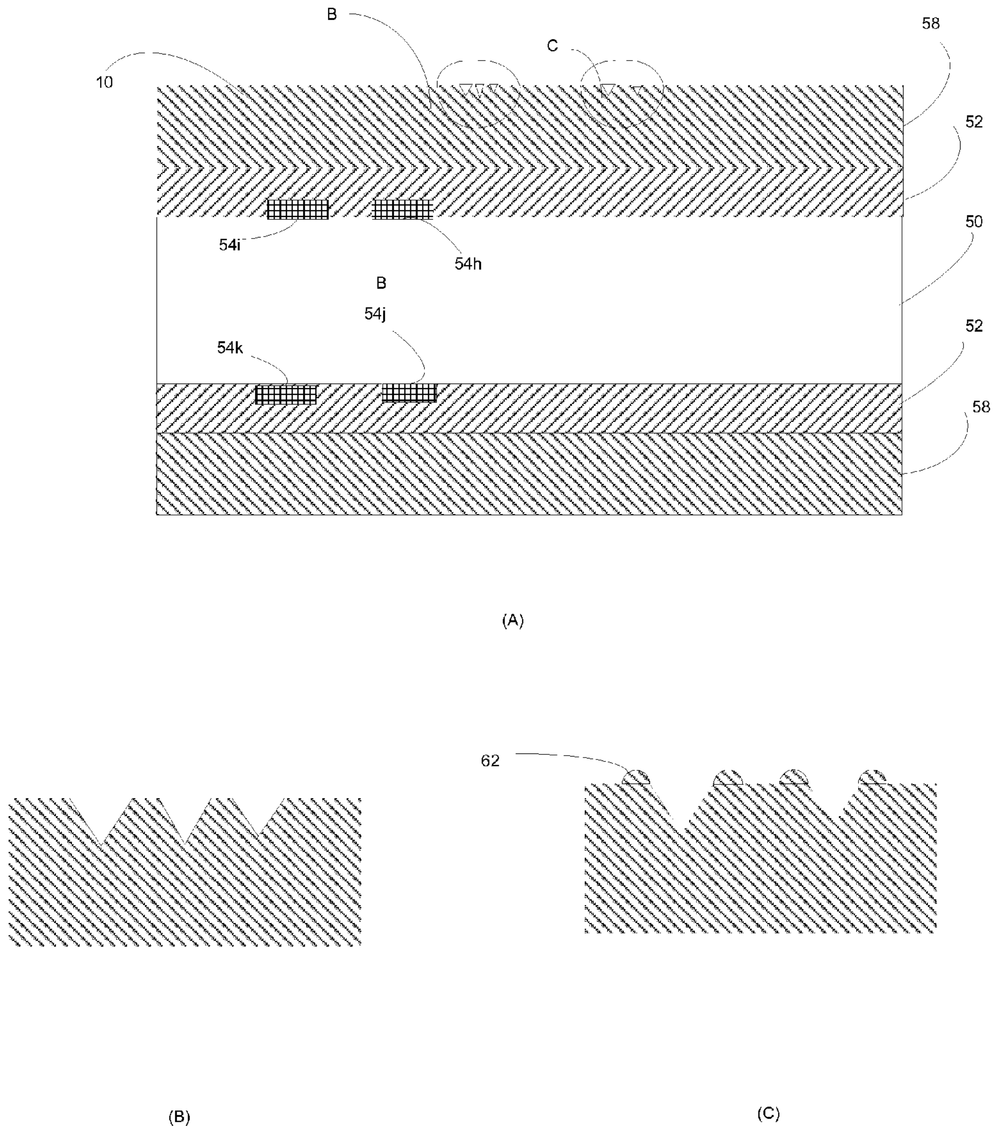
FIG. 6A is an illustrative cross sectional view of the identification document of FIG. 3A taken along the A-A line.
FIG. 6B is a close up view of section B of FIG. 6A.
FIG. 6C is a close up view of section C of FIG. 6A.

In at least one embodiment, the pattern includes a sequence of small holes, ridges, slits, etc. that form the desired text or design. For example, FIGS. 5A and 5B are two illustrative examples of patterns of holes (FIG. 5*a*) and ridges (FIG. 5B) that a laser can etch into the surface of a substrate (the patterns are shown as they appear when viewed at an appropriate angle. FIG. 6A is illustrative cross section of the identification document 10 of FIG. 3A-B, showing an exemplary pattern of engraving. FIG. 6A further illustrates information 54*h*-54*l*, formed in a layer 52 that is disposed between an overlaminate 58 and the core layer 50. The information 54*h*-54*l* can be formed by any known means, including, many different types of conventional printing and also laser marking.

As those skilled in the art will appreciate, the laser can be focused at a specific setting to produce holes of a predetermined diameter, depth and spacing. This etching process creates a pattern that can be tactile or non-tactile, but is not readily visible when seen straight on (e.g., the pattern is visible only in low angle reflected light). For example, FIG. 6B is an enlarged view of section B in FIG. 6A, showing a non-tactile pattern.

In an alternate embodiment, our technology is used to create a tactile and/or non-OVD pattern by adjusting the hole depth and area location of the laser engraving. FIG. 6C is an enlarged view of section C in FIG. 6A, showing a tactile pattern with raised edges 62. Even in this alternative implementation, the feature cannot be photocopied.

Our technology can be used to impart either fixed or variable data onto the document's surface. Because the imparted laser pattern can lie below the document's surface, there is little or no impact on wear during the document's useful life. Additionally, in at least one embodiment, the laser can be controlled by a computer (or other automated process) and linked to a continuous information and document production control process, to prevent impact on throughput or quality on the overall document production process, since the laser etching speed is typically greater than or equal to the card production speed.

We note that some materials are difficult to laser engrave even with text information. For example, some materials, such as silica filled polyolefin, TESLIN, polycarbonate and fused polycarbonate, polyethylene, polypropylene (PPRO), polystyrene, polyolefin, and copolymers are not very sensitive to laser radiation and thus are not especially conducive to laser engraving. We expressly contemplate that the teachings of at least the following commonly assigned patent applications and their progeny can be used in combination with the teachings of the instant application, to improve the laser engraving process:

Sensitizing Materials For Laser Engraving (Application No. 60/344,677, filed Dec. 24, 2001); and Laser Engraving Coating System (Application No. 60/344,675, filed Dec. 24, 2001).

Illustrative examples of ID document materials which can be etched in accordance with at least some embodiments include (but are not limited to) polyester, polycarbonate (PC), fused polycarbonate, polyvinyl chloride (PVC), polyethylene, thermosets, thermoplastic and thermoplastic resins (including those that foam when heated), engineering thermoplastics (ETP), polyurethane, polyamides, expanded polypropylene (EPP), polypropylene, acrylonitrile butadiene styrene (ABS), ABS/PC and ABS/PC products, high impact polystyrene (HIPS), polyethylene terephthalate (PET), PET-G, PET-F, polybutylene terephthalate (PBS), acetal copolymer (POM), and polyetherimide (PEI), polymer, copolymer, polyester, amorphous polyester, polyolefin, silicon-filled polyolefin, TESLIN, foamed polypropylene film, polystyrene, polyacrylate, poly(4-vinylpyridine, poly(vinyl acetate), polyacrylonitrile, polymeric liquid crystal resin, polysulfone, polyether nitride, and polycaprolactone, as well as virtually any known plastic or polymer. Of course, it will be appreciated that embodiments have applicability for the laser engraving and/or marking of plastic materials used to make many different articles formed by virtually any known method, including molding and extruding.

It is expressly is contemplated that the laser etching methods taught herein can be used with any layer (e.g., of a laminate) that is affixed (e.g., by adhesive, lamination, chemical reaction, etc.) to virtually any product, to enable the laminate to be laser etched as taught therein. We further believe that at least some of the laser etching methods taught herein have applicability to the manufacture many different articles that can be marked with a security pattern, a tactile pattern, and/or an optically variable indicia, including but not limited to identification documents, identification cards, credit cards, prepaid cards, phone cards, smart cards, contact cards, contactless cards, combination contact-contactless cards, proximity cards (e.g., radio frequency (RFID) cards), electronic components, tags, packaging, containers, building materials, construction materials, plumbing materials, automotive, aerospace, and military products, computers, recording media, labels, tools and tooling, medical devices, consumer products, and toys. Further, we contemplate that entire articles of manufacture could be formed wholly or partially using a material that contains the laser enhancing additive and then laser engraved or marked.

In addition, the laser engraving facilitated by the present technology can be used to add a digital watermark to any indicia printed (whether conventionally or by laser engraving) on any layer of the ID document 10. Digital watermarking is a process for modifying physical or electronic media to embed a machine-readable code therein. The media may be modified such that the embedded code is imperceptible or nearly imperceptible to the user, yet may be detected through an automated detection process. The code may be embedded, e.g., in a photograph, text, graphic, image, substrate or laminate texture, and/or a background pattern or tint of the photo-identification document. The code can even be conveyed through ultraviolet or infrared inks and dyes.

Digital watermarking systems typically have two primary components: an encoder that embeds the digital watermark in a host media signal, and a decoder that detects and reads the embedded digital watermark from a signal suspected of containing a digital watermark. The encoder embeds a digital watermark by altering a host media signal. To illustrate, if the host media signal includes a photograph, the digital watermark can be embedded in the photograph, and the embedded photograph can be printed on a photo-identification document. The decoding component analyzes a suspect signal to detect whether a digital watermark is present. In applications where the digital watermark encodes information (e.g., a unique identifier), the decoding component extracts this information from the detected digital watermark.

Several particular digital watermarking techniques have been developed. The reader is presumed to be familiar with the literature in this field. Particular techniques for embedding and detecting imperceptible watermarks in media are detailed, e.g., in Digimarc's co-pending U.S. patent application Ser. No. 09/503,881 (now U.S. Pat. No. 6,614,914) and U.S. Pat. No. 6,122,403. Techniques for embedding digital watermarks in identification documents are even further detailed, e.g., in Digimarc's co-pending U.S. patent application Ser. Nos. 10/094,593, filed Mar. 6, 2002, and Ser. No. 10/170,223, filed Jun. 10, 2002 (now U.S. Pat. No. 6,978,036), co-pending U.S. Provisional Patent Application No. 60/358,321, filed Feb. 19, 2002, and U.S. Pat. No. 5,841,886. Each of the above-mentioned U.S. Patent documents is herein incorporated by reference.

CONCLUDING REMARKS

Depending on the availability of lasers, identification documents manufactured in accordance with the present technology can be produced in both over the counter and central issue environments. One example of a printing device that may be usable for at least some over the counter embodiments is the DATACARD DCL30 Desktop Card Laser Personalization System, available from Datacard Group of Minnetonka, Minn.

The identification document 10 may be manufactured in any desired size. For example, identification documents can range in size from standard business card size (47.6.times.85.7 mm) up to identification booklet documents (127.times.177.8 mm), and can have thicknesses in the range of from about 0.3 to about 1.3 mm. At least some identification documents produced in accordance with embodiments of the present technology conform to all the requirements of ISO 7810, 1985 and will thus be of the CR-80 size, 85.47-85.73 mm wide, 53.92-54.03 mm high and 0.69-0.84 mm thick. The corners of such CR-80 documents are rounded with a radius of 2.88-3.48 mm.

Further, while some of the examples above are disclosed with specific core components (e.g., TESLIN), we note that our compositions, methods, articles, features, and processes can be applied to other core-based identification documents as well, including those documents manufactured from other materials. For example, where an embodiment has shown polycarbonate or polyester as an example over-laminate, those skilled in the art will appreciate that many other over laminate materials can be used as well.

To provide a comprehensive disclosure without unduly lengthening the specification, applicants herein incorporate by reference each of the patent documents referenced previously, along with U.S. Pat. Nos. 6,022,905, 5,298,922, 5,294,774, 4,652,722, 5,824,715 and 5,633,119, and U.S. Ser. No. 09/969,200 (now U.S. Pat. No. 6,827,277).

Having described and illustrated the principles of the technology with reference to specific implementations, it will be recognized that the technology can be implemented in many other, different, forms.

Although certain words, languages, phrases, terminology, and product brands have been used herein to describe the various features of illustrative embodiments, their use is not intended as limiting. Use of a given word, phrase, language, terminology, or product brand is intended to include all grammatical, literal, scientific, technical, and functional equivalents. The terminology used herein is for the purpose of description and not limitation.

The technology disclosed herein can be used in combination with other technologies. Examples include the technology detailed in U.S. Pat. Nos. 6,827,277 and 6,923,378. Also, instead of ID documents, the present techniques can be employed with product tags, product packaging, business cards, bags, charts, maps, labels, etc., etc., particularly those items including engraving of an over-laminate structure. The term ID document is broadly defined herein to include these tags, labels, packaging, cards, etc The particular combinations of elements and features in the above-detailed embodiments are exemplary only; the interchanging and substitution of these teachings with other teachings in this and the incorporated-by-reference patents/applications are also expressly contemplated. As those skilled in the art will recognize, variations, modifications, and other implementations of what is described herein can occur to those of ordinary skill in the art without departing from the spirit and the scope of the technology as claimed. Accordingly, the foregoing description is by way of example only and is not intended as limiting. The technology's scope is defined in the following claims and the equivalents thereto.

It will be recognized that all of the patent application documents mentioned above are readily available to the public from the US Patent Office, through its online Patent Application Information Retrieval (PAIR) system.

Having described and illustrated the principles of the technology with reference to specific implementations, it will be recognized that the technology can be implemented in many other, different, forms.

Although certain words, languages, phrases, terminology, and product brands have been used herein to describe the various features of certain embodiments, their use is not intended as limiting. Use of a given word, phrase, language, terminology, or product brand is intended to include all grammatical, literal, scientific, technical, and functional equivalents. The terminology used herein is for the purpose of description and not limitation.

The particular combinations of elements and features in the above-detailed embodiments are exemplary only; the interchanging and substitution of these teachings with other teachings in this and the incorporated-by-reference patents/applications are also expressly contemplated. As those skilled in the art will recognize, variations, modifications, and other implementations of what is described herein can occur to those of ordinary skill in the art without departing from the spirit and the scope of the technology as claimed. Accordingly, the foregoing description is by way of example only and is not intended as limiting. The technology's scope is defined in the following claims and the equivalents thereto.

The invention claimed is:

1. An identity document comprising an outer top laminate layer and at least one interior layer, the document conveying both invariant and personalized information, the personalized information particularly corresponding to a particular person to whom the document is issued, wherein at least some of the personalized information is defined by voids that extend into, but not through, the laminate layer, said voids providing a feature that can be felt by touch.

2. The identity document of claim 1 in which said voids define a visually-perceptible image of said person.

3. The identity document of claim 1 in which at least one layer comprises a polycarbonate.

4. The identity document of claim 1 that further comprises a bar code and a semiconductor device.

5. An identity document comprising at least one interior layer and a laminate layer, an outer surface of the laminate layer defining a top surface of the document, the document conveying both invariant and personalized information, the personalized information particularly corresponding to a particular person to whom the document is issued, wherein at least some of the personalized information is defined by laser-ablated voids that extend through the top surface of the document, and wherein at least some of said voids are defined by sidewalls that are angled obliquely, rather than perpendicularly, relative to said top surface.

6. The identity document of claim 5 wherein said voids define a feature that can be felt by touch.

7. A method of manufacturing an identification document for a person, comprising:

printing information, including invariant information, on a document core;

applying a laminate layer atop the printed core; and laser-ablating the laminate layer to impart a tactile feature thereto, without ablating the document core, said tactile feature being personalized to correspond to said person.

8. An identification document comprising at least one layer of material, the top surface of the document including a laser-formed void pattern creating an indicia, the document characterized by raised features that are also laser-formed, said raised features comprising foamed material, the raised features extending above a nominal top surface level of the document to provide a tactile effect that aids in verifying the authenticity of the document.

* * * * *